US012155557B2

United States Patent
Zhao et al.

(10) Patent No.: US 12,155,557 B2
(45) Date of Patent: Nov. 26, 2024

(54) LOAD SHARING METHOD AND NETWORK DEVICE

(71) Applicant: HUAWEI TECHNOLOGIES CO., LTD., Shenzhen (CN)

(72) Inventors: Yan Zhao, Beijing (CN); Nan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 244 days.

(21) Appl. No.: 17/541,437

(22) Filed: Dec. 3, 2021

(65) Prior Publication Data

US 2022/0094630 A1  Mar. 24, 2022

Related U.S. Application Data

(63) Continuation of application No. PCT/CN2020/093806, filed on Jun. 1, 2020.

(30) Foreign Application Priority Data

Jun. 4, 2019 (CN) .......................... 201910482206.5

(51) Int. Cl.
*H04L 45/24* (2022.01)
*H04L 47/125* (2022.01)
*H04L 47/17* (2022.01)

(52) U.S. Cl.
CPC ............ *H04L 45/24* (2013.01); *H04L 47/125* (2013.01); *H04L 47/17* (2013.01)

(58) Field of Classification Search
CPC ........ H04L 45/24; H04L 45/125; H04L 47/17
See application file for complete search history.

(56) References Cited

U.S. PATENT DOCUMENTS

| 7,636,309 B2 | 12/2009 | Alicherry et al. |
| 9,942,156 B1 * | 4/2018 | Zhou ..................... H04L 47/125 |

(Continued)

FOREIGN PATENT DOCUMENTS

| CN | 103973585 A | 8/2014 |
| CN | 104885212 A | 9/2015 |

(Continued)

OTHER PUBLICATIONS

Wang Chunlai, Analytical Model of Multi-path Minimal Routing NoC Based on Network Calculus, A Dissertation Submitted for the Degree of Master, Hefei University of Technology, Apr. 2015, with an English Abstract, total 74 pages.

(Continued)

*Primary Examiner* — Donald L Mills
(74) *Attorney, Agent, or Firm* — Rimon PC

(57) ABSTRACT

According to a load sharing method and a network device, traffic distribution ratios are correspondingly preset for different paths. For example, an equivalent resistance method is used as a load sharing algorithm provided in embodiments of this application, to calculate a corresponding traffic distribution ratio for each possible path. The traffic distribution ratio and the corresponding path are preset for a corresponding node. In this way, traffic entering a network device is distributed to each path in the network device based on the preset ratio, without causing excessive bandwidth pressure on a shortest path, to implement relatively optimal load balancing. For the network device with either a ring network structure or a stereoscopic network structure, a requirement for a link bandwidth between the nodes in the network device can be reduced.

15 Claims, 16 Drawing Sheets

FIG. 11

(56) References Cited

U.S. PATENT DOCUMENTS

| | | | |
|---|---|---|---|
| 2015/0172171 A1 | 6/2015 | Beller et al. | |
| 2019/0097949 A1* | 3/2019 | Viradiya | H04L 49/70 |
| 2019/0288946 A1* | 9/2019 | Gupta | H04L 45/38 |
| 2020/0322258 A1* | 10/2020 | Oprea | H04L 47/6225 |
| 2022/0103661 A1* | 3/2022 | Goel | H04L 47/18 |

FOREIGN PATENT DOCUMENTS

| | | |
|---|---|---|
| CN | 104954275 A | 9/2015 |
| CN | 106998302 A | 8/2017 |
| CN | 109479214 A | 3/2019 |
| CN | 109599141 A | 4/2019 |

OTHER PUBLICATIONS

Zhengyu Wang et al, Ring based Optical Network-on-Chip, 2011 Elsevier B.V. All rights reserved, total 8 pages.

Evgeny Bolotin et al, Routing Table Minimization for Irregular Mesh NoCs, 2007 EDAA, total 6 pages.

Gaoming Du et al, OLITS: An Ohm's Law-like Traffic Splitting Model Based on Congestion Prediction, 2016 EDAA, total 6 pages.

\* cited by examiner

Resistor network

LOAD SHARING METHOD AND NETWORK DEVICE

CROSS-REFERENCE TO RELATED APPLICATIONS

This application is a continuation application of International Patent Application No. PCT/CN2020/093806, filed on Jun. 1, 2020, which claims priority to Chinese Patent Application No. 201910482206.5, filed on Jun. 4, 2019. The disclosures of the aforementioned applications are hereby incorporated by reference in their entireties.

TECHNICAL FIELD

This application relates to the field of communications technologies, and in particular, to a load sharing method and a network device.

BACKGROUND

Due to increasing requirements for a switching capability of a single network device, it is desirable that a quantity of nodes integrated in the network device, that is, a quantity of bare dies can be increased. A network architecture formed by the plurality of nodes in the network device needs to meet a non-blocking switching condition: Input traffic at a network-side ingress of each node is less than or equal to a bandwidth at the network-side ingress of the node, and output traffic sent to a network-side egress of each node is less than or equal to a bandwidth at the network-side egress of the node. However, if more nodes are integrated in the network device, a greater bandwidth needs to be configured for a link between the nodes in the network device to meet a non-blocking switching condition. Currently, it is relatively difficult for the network device to balance the increasing requirement for the switching capability and design pressure of the increasing link bandwidth.

Therefore, it is desirable to provide a solution in which the network device can integrate a relatively large quantity of nodes to improve the switching capability, to ensure that the network device can implement non-blocking switching while the requirement for the network bandwidth between the nodes is reduced.

SUMMARY

On this basis, embodiments of this application provide a load sharing method in a network device, and a corresponding network device, which avoid an excessively high requirement for network bandwidth between nodes when a relatively large quantity of nodes are integrated in the network device, thereby implementing a balance between a switching capability and link bandwidth requirements.

According to a first aspect, an embodiment of this application provides a load sharing method, including: A first node in a network device receives a first packet and a second packet, where the first packet and the second packet correspond to the same source node and the same destination node in the network device. The first node forwards the first packet to the destination node along a first path based on a preset first traffic distribution ratio. The first node sends the second packet to the destination node along a second path based on a preset second traffic distribution ratio. In some embodiments, the first traffic distribution ratio and the second traffic distribution ratio are determined based on a load sharing algorithm provided in this embodiment of this application, for example, an equivalent resistance method. In some embodiments, the load sharing method may be applied to a network device that includes at least four nodes forming a stereoscopic network structure. The stereoscopic network structure indicates that at least one node in the network device is directly connected to more than two nodes. In another example, the load sharing method may also be applied to a network device that includes at least three nodes forming a ring network structure. The ring network structure indicates that each node in the network device is directly connected to two nodes. If the source node and the destination node are two fully symmetrical nodes in the ring network structure, the first traffic distribution ratio is equal to the second traffic distribution ratio. If the source node and the destination node are two asymmetrical nodes in the ring network structure, the first traffic distribution ratio is not equal to the second traffic distribution ratio.

Traffic distribution ratios can be correspondingly preset for different paths. For example, the equivalent resistance method is used as the load sharing algorithm provided in this embodiment of this application, to calculate a corresponding traffic distribution ratio for each possible path. The traffic distribution ratio and the corresponding path are preset for a corresponding node. In this way, traffic can be distributed to each path based on the preset ratio, without causing excessive bandwidth pressure on a shortest path, to implement relatively optimal load balancing. For the network device with either the ring network structure or the stereoscopic network structure, a requirement for a link bandwidth between the nodes in the network device can be reduced. In other words, a relatively small link bandwidth may be designed to implement non-blocking switching, to achieve a proper balance between a switching capability and a link bandwidth design.

In this application, the equivalent resistance method indicates a load sharing algorithm. The traffic distribution ratio on each path is determined by using the equivalent resistance method. A basic principle of implementing load balancing by using the equivalent resistance method is described as follows: A structure formed by the network nodes in the network device is correspondingly understood as a resistor network. The network node is correspondingly understood as a circuit node. A bandwidth between the network nodes is correspondingly understood as an equivalent resistance between circuit nodes (where the bandwidth is inversely proportional to a value of the equivalent resistance). A problem relating to a path option of traffic from the source node to the destination node and a traffic distribution ratio in the network device are correspondingly understood as a problem relating to a path option of a current from an input circuit node to an output circuit node and a current distribution ratio in the resistor network. In this example, a result of the path option of the current in the resistor network and a result of the distribution ratio of the current in the resistor network are obtained based on knowledge such as the Kirchhoff voltage law and the Kirchhoff current law in the physics. In this example, the results correspond to the path option of the traffic and the traffic distribution ratio in the network device.

With reference to a specific implementation of the first aspect, if the first node is the source node, indication information that is of the first path and that is stored in the first node is used to indicate each hop node on the first path from the source node to the destination node, and indication information that is of the second path and that is stored in the first node is used to indicate each hop node on the second path from the source node to the destination node. In this example, after the first node in the network device receives the first packet and the second packet, the method further includes: The first node encapsulates the indication information of the first path into the first packet. The first node encapsulates the indication information of the second path into the second packet. In this way, after traffic to the same destination node enters the network device from the first node, load sharing is performed only once at the source node. Specifically, a path that includes each hop node and that is determined based on a traffic distribution ratio is separately encapsulated into a corresponding packet, and the encapsulated packet is separately forwarded based on encapsulated indication information of the path including each hop node.

With reference to another specific implementation of the first aspect, regardless of whether the first node is the source node or an intermediate node, indication information that is of the first path and that is stored in the first node is used to indicate a first next hop node of the first node on the first path from the source node to the destination node, and indication information that is of the second path and that is stored in the first node is used to indicate a second next hop node of the first node on the second path from the source node to the destination node. In this example, that the first node sends the first packet to the destination node along the first path based on the preset first traffic distribution ratio may include: The first node sends the first packet to the first next hop node based on the indication information of the first path. That the first node sends the second packet to the destination node along the second path based on the preset second traffic distribution ratio may include: The first node sends the second packet to the second next hop node based on the indication information of the second path. In this way, after traffic to the same destination node enters the network device from the first node, load sharing is performed on the source node and each hop intermediate node. To be specific, a load sharing process is performed once at each hop node of the network device based on a preset traffic distribution ratio, to determine a next hop node of the current hop node. In this way, load balancing is more flexibly implemented, and a load sharing capability of a network device is improved.

In some embodiments, the first node in the network device stores indication information of each path. The indication information may include information used to indicate each hop node on the path from the source node to the destination node; and/or information used to indicate a next hop node of the first node on the path from the source node to the destination node. The indication information may be alternatively information used to indicate each hop node on a path from the source node to the second node. In this example, the second node to the destination node need to store indication information used to indicate a next hop node of a current hop node on a path from the second node to the destination node. Alternatively, the first node to a third node may store indication information, where the indication information is used to indicate a next hop node of a current hop node on a path from the first node to a third node. In this example, the third node to the destination node need to store information used to indicate each hop node on a path from the third node to the destination node. In addition, on the same first node, the stored indication information of the first path may be the same as or different from the stored indication information of the second path. This may be flexibly configured.

In some embodiments, the first node may determine a granularity of the first traffic distribution ratio and the second traffic distribution ratio based on any one of the following parameters: a packet quantity or a packet length. The packet length may be a length of bytes included in a packet or a quantity of units included in a packet.

With reference to still another specific implementation of the first aspect, if the network device in this embodiment of this application has a stereoscopic network structure, for example, the stereoscopic network structure may be specifically a tetrahedron, a hexahedron, an octahedron, or a triangular prism.

According to a second aspect, an embodiment of this application further provides a network device. The network device includes at least four nodes. The at least four nodes include a first node, a second node, a third node, and a fourth node. The first node is directly connected to the second node, the third node, and the fourth node. In addition, the first node is configured to: receive a packet, and send the packet to the second node, the third node, or the fourth node. It may be learned that, in this embodiment of this application, a stereoscopic network structure is constructed for a network device including a plurality of nodes. In comparison with a ring network structure including the same quantity of nodes, in the stereoscopic network structure, a node is connected to more adjacent nodes, that is, a quantity of path options from each node to another node increases. A switching capability and a link bandwidth may be properly balanced when the network device is designed to balance an increasing requirement for the switching capability and design pressure on the increasing link bandwidth.

With reference to a specific implementation of the second aspect, the at least four nodes form a stereoscopic network structure, and the stereoscopic network structure is a tetrahedron, a hexahedron, an octahedron, or a triangular prism.

According to a third aspect, an embodiment of this application further provides a network device, including a first node and a second node. The first node is configured to receive a first packet and a second packet, where the first packet and the second packet correspond to the same source node and the same destination node in the network device, and the destination node is the second node. The first node is further configured to forward the first packet to the destination node along a first path based on a preset first traffic distribution ratio. The first node is further configured to send the second packet to the destination node along a second path based on a preset second traffic distribution ratio. In some embodiments, the network device may be a network device that includes at least four nodes forming a stereoscopic network structure. The stereoscopic network structure indicates that at least one node in the network device is directly connected to more than two nodes. In another example, the network device may be a network device that includes at least three nodes forming a ring network structure. The ring network structure indicates that each node in the network device is directly connected to two nodes. If the source node and the destination node are two fully symmetrical nodes in the ring network structure, the first traffic distribution ratio is equal to the second traffic distribution ratio. If the source node and the destination node are two asymmetrical nodes in the ring network structure, the first traffic distribution ratio is not equal to the second traffic distribution ratio.

With reference to a specific implementation of the third aspect, if the first node is the source node, the first node is further configured to: after the first packet is received, encapsulate indication information of the first path into the first packet, where the indication information of the first path is used to indicate each hop node on the first path from the source node to the destination node. In this way, after traffic to the same destination node enters the network device from the first node, load sharing is performed only once at the source node. Specifically, a path that includes each hop node and that is determined based on a traffic distribution ratio is separately encapsulated into a corresponding packet, and the encapsulated packet is separately forwarded based on encapsulated indication information of the path including each hop node.

With reference to another specific implementation of the third aspect, the first node may be further specifically configured to send the second packet to a next hop node of the first node based on indication information of the second path. In this way, after traffic to the same destination node enters the network device from the first node, load sharing is performed on the source node and each hop intermediate node. To be specific, a load sharing process is performed once at each hop node of the network device based on a preset traffic distribution ratio, to determine a next hop node of the current hop node. In this way, load balancing is more flexibly implemented, and a load sharing capability of a network is improved.

In some embodiments, the first traffic distribution ratio and the second traffic distribution ratio are determined by using an equivalent resistance method.

In some embodiments, the first node may determine a granularity of the first traffic distribution ratio and the second traffic distribution ratio based on any one of the following parameters: a packet quantity or a packet length.

With reference to still another specific implementation of the third aspect, if the plurality of nodes included in the network device form a stereoscopic network structure, the stereoscopic network structure may be a tetrahedron, a hexahedron, an octahedron, or a triangular prism.

In some embodiments, the network device provided in the third aspect corresponds to the load sharing method provided in the first aspect. Therefore, for various possible implementations and technical effects of the network device provided in the third aspect, refer to the descriptions of the load sharing method provided in the first aspect.

According to a fourth aspect, an embodiment of this application provides a network device, including a receiving unit and a sending unit. The receiving unit is configured to receive a first packet and a second packet by using a first node. The first packet and the second packet correspond to the same source node and the same destination node in the network device. The sending unit is configured to: forward the first packet to the destination node along a first path by using the first node based on a preset first traffic distribution ratio; and send the second packet to the destination node along a second path by using the first node based on a preset second traffic distribution ratio. In some embodiments, the network device may be a network device that includes at least four nodes forming a stereoscopic network structure. The stereoscopic network structure indicates that at least one node in the network device is directly connected to more than two nodes. In another example, the network device may also be applied to a network device that includes at least three nodes forming a ring network structure. The ring network structure indicates that each node in the network device is directly connected to two nodes. If the source node and the destination node are two fully symmetrical nodes in the ring network structure, the first traffic distribution ratio is equal to the second traffic distribution ratio. If the source node and the destination node are two asymmetrical nodes in the ring network structure, the first traffic distribution ratio is not equal to the second traffic distribution ratio.

With reference to a specific implementation of the fourth aspect, the first node is the source node, and the network device further includes a processing unit. The processing unit is configured to: after the first packet is received by using the first node, encapsulate indication information of the first path into the first packet, where the indication information of the first path is used to indicate each hop node on the first path from the source node to the destination node. In this way, after traffic to the same destination node enters the network device from the first node, load sharing is performed only once at the source node. Specifically, a path that includes each hop node and that is determined based on a traffic distribution ratio is separately encapsulated into a corresponding packet, and the encapsulated packet is separately forwarded based on the encapsulated indication information of the path including each hop node.

With reference to another specific implementation of the fourth aspect, the sending unit is specifically configured to send the second packet to a next hop node of the first node based on indication information of the second path. In this way, after traffic to the same destination node enters the network device from the first node, load sharing is performed on the source node and each hop intermediate node. To be specific, a load sharing process is performed once at each hop node of the network device based on a preset traffic distribution ratio, to determine a next hop node of the current hop node. In this way, load balancing is more flexibly implemented, and a load sharing capability of a network device is improved.

In some embodiments, the first traffic distribution ratio and the second traffic distribution ratio are determined by using an equivalent resistance method.

In some embodiments, the first node determines a granularity of the first traffic distribution ratio and the second traffic distribution ratio based on any one of the following parameters: a packet quantity or a packet length.

With reference to still another specific implementation of the fourth aspect, the plurality of nodes included in the network device form a stereoscopic network structure. The stereoscopic network structure may be specifically a tetrahedron, a hexahedron, an octahedron, or a triangular prism.

In some embodiments, the network device provided in the fourth aspect corresponds to the load sharing method provided in the first aspect. Therefore, for various possible implementations and technical effects of the network device provided in the fourth aspect, refer to the descriptions of the load sharing method provided in the first aspect.

According to a fifth aspect, an embodiment of this application further provides a network device, where the network device includes a memory and a processor. The memory is configured to store program code. The processor is configured to run instructions in the program code, so that the network device performs the load sharing method in any one of the implementations of the first aspect.

According to a sixth aspect, an embodiment of this application further provides a computer program product. When the computer program product runs on a computer, the computer is enabled to perform the load sharing method according to any one of the implementations of the first aspect.

According to a seventh aspect, an embodiment of this application further provides a computer-readable storage medium. The computer-readable storage medium stores instructions. When the instructions are run on a computer, the computer is enabled to perform the load sharing method according to any one of the implementations of the first aspect.

BRIEF DESCRIPTION OF DRAWINGS

To describe technical solutions in the embodiments of this application more clearly, the following briefly describes the accompanying drawings for describing the embodiments. It is clear that the accompanying drawings in the following descriptions show merely some embodiments of this application, and a person of ordinary skill in the art may derive other drawings from these accompanying drawings.

DESCRIPTION OF EMBODIMENTS

Figure 1:
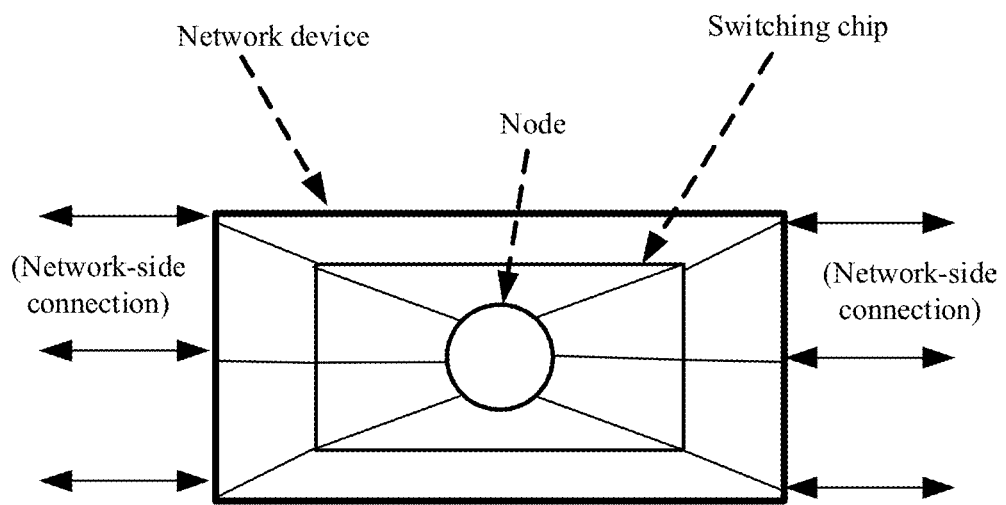
FIG. 1 is a schematic diagram of a structure of a network device according to an embodiment of this application.

With a surge in a data volume, it is desirable that a switching capability of a network device, such as a network switching device, be improved. The switching capability of the network device is related to a quantity of nodes (also referred to as dies) packaged in the network device. In other words, more nodes packaged in the network device indicate that the network device can provide a stronger switching capability. For an internal structure of the network device, as shown in FIG. 1, one network device includes one switching chip, and at least one node is packaged in the switching chip. In some embodiments, one node mentioned in the embodiments of this application represents one die, that is, one basic division unit in an entire silicon chip or a wafer in a semiconductor technology.

Figure 2A:
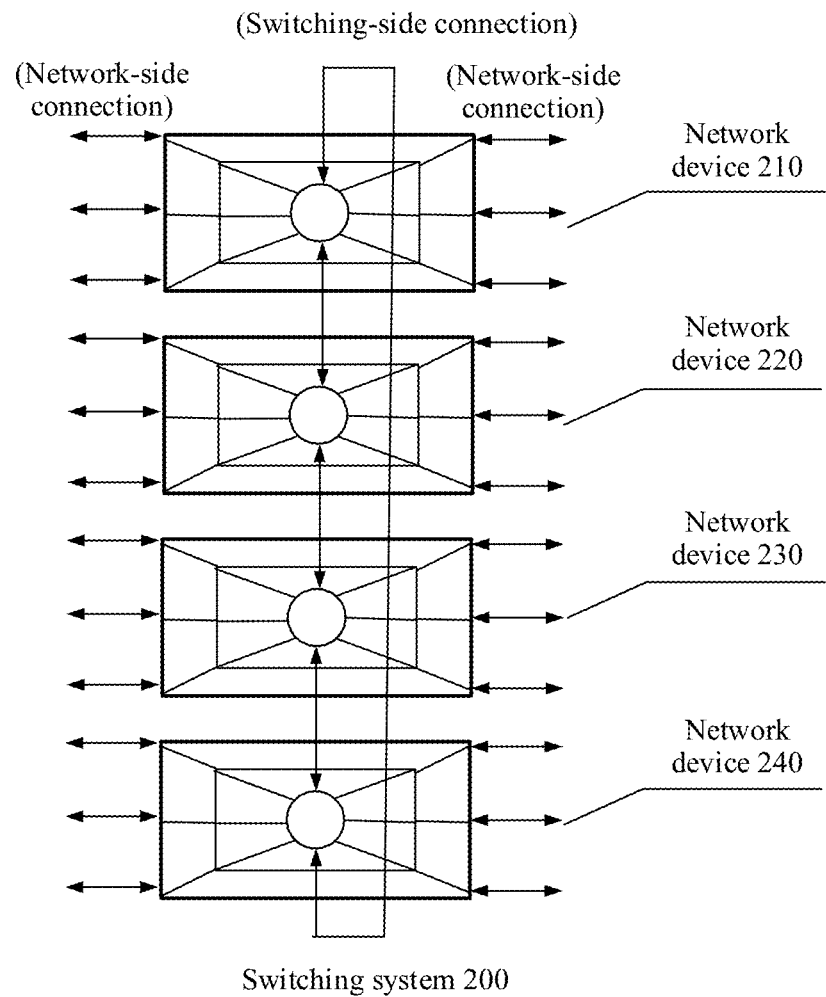
FIG. 2a is a schematic diagram of a structure of a ring network system 200 formed by a plurality of network devices according to an embodiment of this application.
Figure 2B:
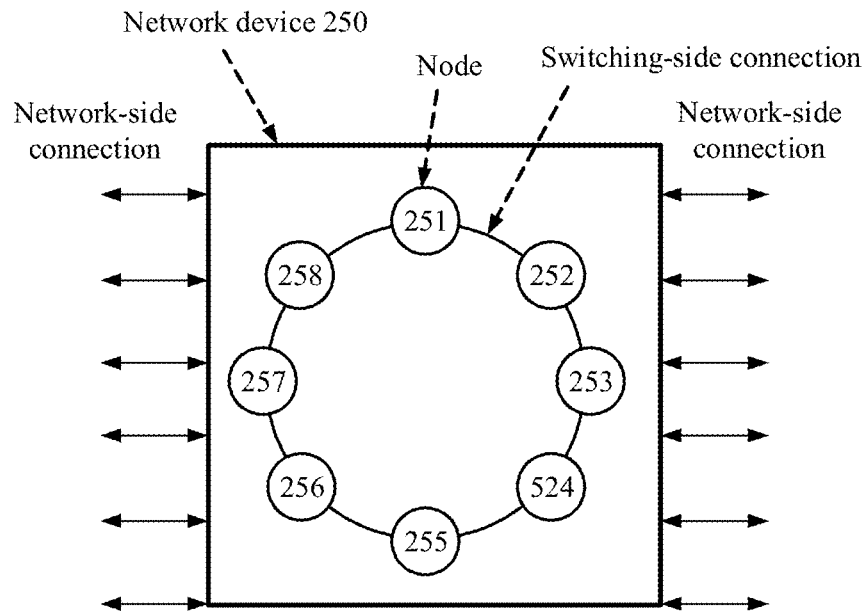
FIG. 2b is a schematic diagram of a structure of a network device 250 according to an embodiment of this application.

It is desirable that a quantity of network-side ports of the network be increased. In other words, the network device needs to provide an increasingly high switching capability. Currently, in a manner used to improve the switching capability of the network device, for example, as shown in FIG. 2a, four network devices 210 to 240 shown in FIG. 1 may be connected to form a ring network system 200. The ring network system may be considered as one network device for use. The network devices 210 to 240 each may include one or two switching chips. Each switching chip may further include one or two nodes. For another example, as shown in FIG. 2b, a plurality of nodes may be packaged in a single network device. For example, eight nodes 251 to 258 are packaged in a network device 250. The eight nodes form a ring network structure in the network device 250. To be specific, each node has only two adjacent nodes. The eight nodes may be separately packaged in one or more switching chips in the network device 250. In the foregoing two manners, a quantity of nodes included in the network device can be increased, so that a quantity of network-side ports increases, to improve the switching capability of the network device.

However, when the network device is designed, in addition to the switching capability of the network device, another indicator of the network device further needs to be considered, for example, a fabric speedup or a delay of each node in the network device when the network device implements non-blocking switching. In some embodiments, that the network device meets a non-blocking switching condition may include that input traffic at a network-side ingress of each node is less than or equal to a bandwidth at the network-side ingress of the node, and output traffic sent to a network-side egress of each node is less than or equal to a bandwidth at the network-side egress of the node. When the non-blocking switching condition is met, load sharing is generally performed on each node in the network switching device by using a shortest path first algorithm. In this way, a fabric speedup is correspondingly calculated for each node in the network device, and a maximum fabric speedup is selected from the fabric speedups corresponding to the nodes, and is used as a basis for designing a switching-side link bandwidth between the nodes in the network device. Herein, the fabric speedup of the node=a sum of switching-side link bandwidths between the node and each of all adjacent nodes directly connected to the node/a network-side bandwidth of the node. The node 251 in the network device 250 shown in FIG. 2b is used as an example. A fabric speedup of the node 251=(a bandwidth between the node 251 and the node 252+a bandwidth between the node 251 and the node 258)/a network-side bandwidth of the node 251.

When the requirement for the switching capability of the network device is relatively high, a relatively large quantity of nodes need to be packaged in the network device. In this example, to ensure that non-blocking switching can be implemented on all the nodes in the network device, a relatively large fabric speedup needs to be set for each node in the network device. In addition, the fabric speedup of each node further needs to increase as the quantity of nodes in the network device increases. However, as the fabric speedup increases, a relatively large link bandwidth needs to be designed between the nodes in the network device. This is difficult to implement.

On this basis, when the switching capability needs to be continuously improved, to ensure that the network device can implement non-blocking switching as much as possible when a relatively small link bandwidth is designed, an embodiment of this application provides a load sharing method for the network device. An equivalent resistance method is used in load sharing on nodes in various network devices mentioned in the embodiments of this application, and is used as a load sharing algorithm provided in the embodiments of this application. In this method, a traffic distribution ratio is correspondingly calculated for each possible path, and the traffic distribution ratio and the corresponding path are preset for a corresponding node, to ensure that traffic forwarded on each path in the network device meets a preset traffic distribution ratio. In this way, in comparison with a case in which the load sharing is performed in the network device by using the shortest path first algorithm, by using the load sharing algorithm: the equivalent resistance method, traffic can be distributed to each path based on a preset ratio without causing excessively large bandwidth pressure on a shortest path, to implement relatively optimal load balancing. For the network device with either a ring network structure or a stereoscopic network structure, a requirement for a link bandwidth between the nodes in the network device can be reduced. In other words, a relatively small link bandwidth may be designed to implement non-blocking switching, to implement a proper balance between the switching capability and the design of the link bandwidth.

In addition, to resolve a problem that it is difficult for the current network device to balance the continuously increasing requirement for the switching capability and the increasing pressure on the design of the link bandwidth, an embodiment of this application further provides a network device with a stereoscopic network structure including a plurality of nodes. In comparison with a ring network structure including the same quantity of nodes, in the stereoscopic network structure, a node is connected to more adjacent nodes, that is, a quantity of path options from each node to another node increases, to properly balance the switching capability and the link bandwidth when the network device is designed.

In some embodiments, in various network structures including the nodes in the network device, when different load sharing algorithms (including the shortest path first algorithm and the equivalent resistance method) are used, for a specific value of the fabric speedup of the network device and a relationship between the fabric speedup and the quantity of nodes included in the network device, refer to Table 18 and related descriptions in an effect comparison part later described in the embodiments of this application.

Figure 3A:
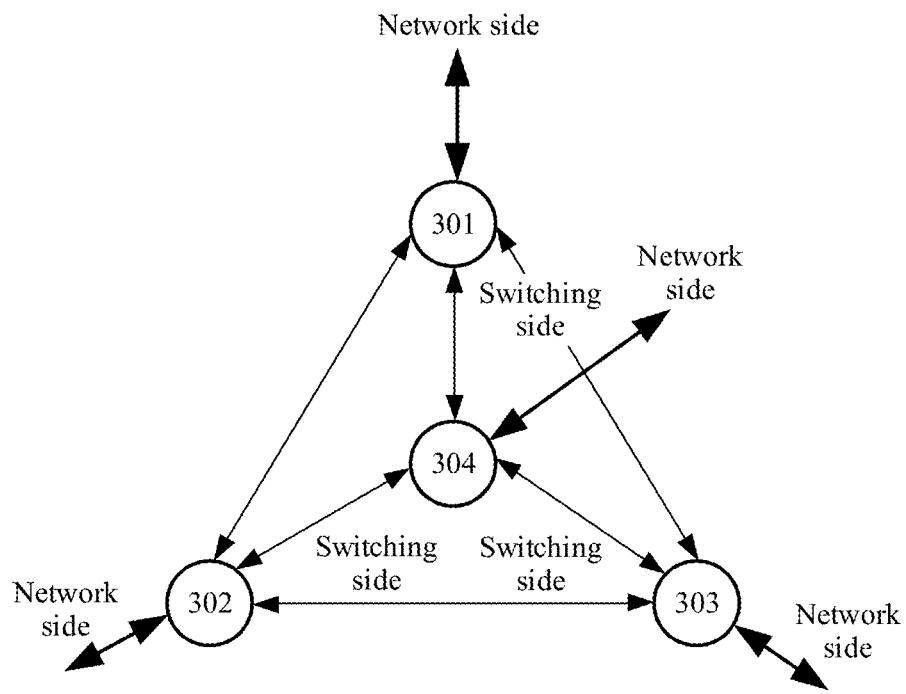
FIG. 3a is a schematic diagram of a structure of a network device 300 including four nodes according to an embodiment of this application.

For example, one of scenarios in the embodiments of this application may be applied to a network device 300 shown in FIG. 3a. The network device 300 includes four nodes: a node 301, a node 302, a node 303, and a node 304. Each node is separately connected to other three nodes. The four nodes form a tetrahedral stereoscopic network structure. The node 301, the node 302, the node 303, and the node 304 each correspond to one group of network-side ports. The network-side ports are configured to connect to a network-side port of another external network device. The node 301, the node 302, the node 303, and the node 304 also each correspond to three groups of switching-side ports. The switching-side ports are configured to interconnect the four nodes on a switching side.

In some embodiments, the node in the network device is connected to the external device by using the network-side port corresponding to the node. A packet (or traffic) forwarding path in the network device may be a path including a node in the network device in a process that starts from the packet entering the network device from the external device to the packet being sent from the network device to the another external device. A node corresponding to a network-side port through which the packet enters the network device from the external device is referred to as a source node. Anode corresponding to a network-side port through which the packet is sent out of the network device is referred to as a destination node. In a process of sending the packet in the network device, a node between the source node and the destination node is referred to as an intermediate node. In some embodiments, a unicast packet is transmitted in a network device. There may be one or more path options. However, there is only one source node and only one destination node, and there may be zero intermediate nodes, one intermediate node, or more intermediate nodes.

It is assumed that a network-side port b corresponding to the node 302 in the network device 300 receives traffic with a 1.0 bandwidth from a network side, the traffic includes four packets: a packet 1 to a packet 4, and the traffic is sent out of the network device 300 by using a network-side port corresponding to the node 301. In other words, the source node is the node 302, and the destination node is the node 301. Herein, 1.0 indicates a network bandwidth, and may be specifically considered as 400 Gbps (herein, Gbps is a unit of a switching bandwidth, and 1 Gbps indicates 1000 megabits per second), 800 Gbps, or the like. The 1.0 bandwidth is similar to considering any specific bandwidth as one bandwidth share, to facilitate subsequent traffic distribution ratio calculation and traffic distribution.

For example, various path options and corresponding traffic distribution ratios may be calculated by using the load sharing algorithm: the equivalent resistance method when the node 302 serves as the source node and the node 301 serves as the destination node.

Figure 3B:
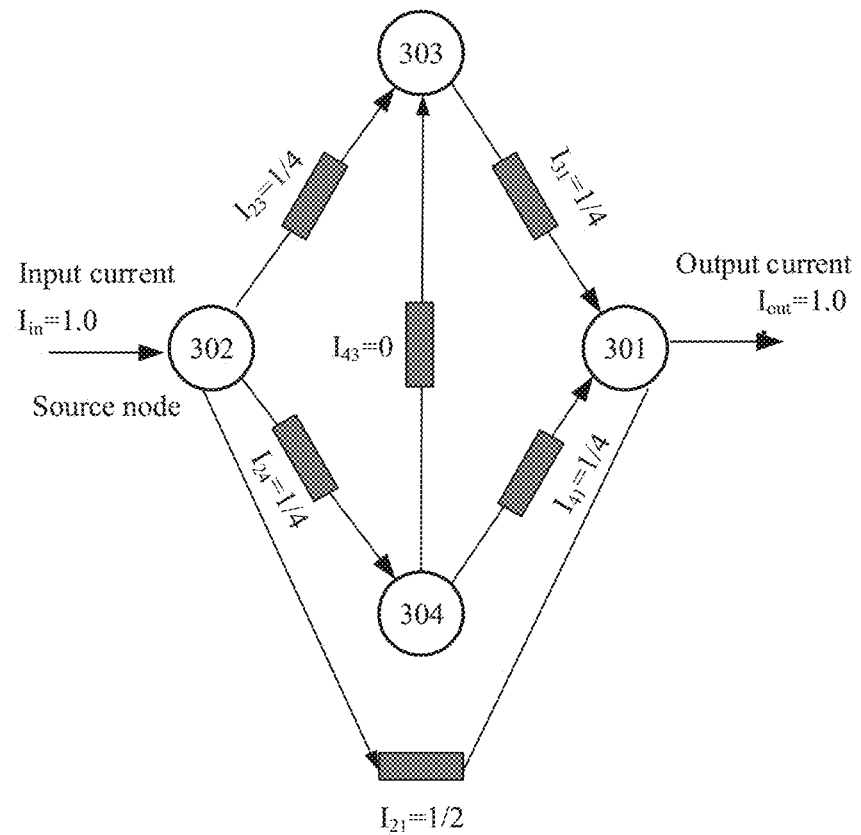
FIG. 3b is a schematic diagram of a structure of a resistor network corresponding to a network device 300 according to an embodiment of this application.

In some embodiments, it is assumed that link bandwidths between the adjacent nodes in the network device 300 are equal. First, the network device 300 is equivalent to a resistor network shown in FIG. 3b. Specifically, the node 302 is equivalent to an input circuit node 302, the node 301 is equivalent to an output circuit node 301, and the node 303 and the node 304 are equivalent to a circuit node 303 and a circuit node 304. Equivalent resistors R with the same resistance value are set on links between the nodes in the network device 300. Then, in the resistor network in FIG. 3b, a 1.0 current is input from the input circuit node 302, and output from the output circuit node 301. A current flowing through each equivalent resistor R is calculated based on the Kirchhoff voltage law and the Kirchhoff current law. The traffic distribution ratios in Table 1 may be specifically obtained through solving the following equations:

$I_{21} + I_{23} + I_{24} =$ $I_{in} = 1.0$ ... (An output current of the input resistor node 302 is equal to an input current of the input resistor node 302)

$I_{21} + I_{41} + I_{31} = I_{out} = 1.0$ ... (An output current of the input resistor node 301 is equal to an input current of the output resistor node 301)

$I_{23} + I_{43} = I_{31}$ ... (An input current of the resistor node 303 is equal to an output current of the resistor node 303)

$I_{43} + I_{41} = I_{24}$ ... (An input current of the resistor node 304 is equal to an input current of the resistor node 304)

$I_{23}R = I_{43}R + I_{24}R$ ... (Voltages on two paths from the resistor node 302 to 303 are equal)

$I_{41}R = I_{43}R + I_{31}R$ ... (Voltages on two paths from the resistor node 304 to 301 are equal)

$I_{21}R = I_{23}R + I_{31}R$ ... (Voltages on two paths from the resistor node 302 to 301 are equal)

$I_{21}R = I_{24}R + I_{41}R$ ... (Voltages on two paths from the resistor node 302 to 301 are equal)

In the foregoing equations, $I_{ij}$ represents a current flowing through an equivalent resistor R on a path from a resistor node $30i$ to a resistor node $30j$, where i or j is equal to 1, 2, 3, or 4. When the foregoing equations are solved, the following can be obtained: $I_{21}=½$, $I_{23}=I_{24}=I_{31}=I_{41}=¼$, and $I_{43}=0$. Finally, the current $I_{ij}$ flowing through the equivalent resistor R on the path from the resistor node $30i$ to the resistor node $30j$ corresponds to the path from the node $30i$ to the node $30j$ in the network device 300 and is used as a traffic distribution ratio corresponding to the path, to obtain a correspondence table between the path option: the node 302→the node 301 and the traffic distribution ratio shown in Table 1. Table 1 or information essentially including the same content as Table 1 is stored in the source node 302. For specific content, refer to related descriptions in an embodiment shown in FIG. 10.

TABLE 1

The correspondence table between the path option: the node 302->the node 301 and the traffic distribution ratio

| Number of a destination node | Path option | Traffic distribution ratio |
|---|---|---|
| 301 | 302->301 | 1/2 |
|  | 302->303->301 | 1/4 |
|  | 302->304->301 | 1/4 |

With reference to Table 1, for four received packets, the source node 302 may determine a path for ½ of the four packets, that is, two packets, e.g. a packet 1 and a packet 2, the path determined for the packet 1 and the packet 2 is the node 302→the node 301. In this example, the node 302 may directly send the packets 1 and 2 to the node 301 by using a switching-side port, and the node 301 may send the packets 1 and 2 to an external device by using a network-side port a of the node 301. The source node 302 may further determine a path for ¼ of the four received packets, that is, one packet, e.g. the packet 3, the path determined for the packet 3 is the node 302→the node 303→the node 301. In this example, the node 302 may send the packet 3 to the node 303 by using the switching-side port. The node 303 may send the packet to the node 301, and the node 301 may send the packet to an external device by using the network-side port a. The source node 302 may further determine a path for ¼ of the four received packets, that is, one packet, e.g. the packet 4, the path determined for the packet 4 is the node 302→the node 304→the node 301. In this example, the node 302 may send the packet 4 to the node 304 by using the switching-side port, the node 304 may send the packet to the node 301, and the node 301 may send the packet to an external device by using the network-side port a. In this way, the following process is completed: The packet 1 to the packet 4 are received from a network-side port b corresponding to the node 302, and forwarded out from the network-side port a corresponding to the node 301.

For another example, each possible next hop and a corresponding traffic distribution ratio that are obtained through calculation by using the equivalent resistance method when the node 302 serves as the source node and the node 301 serves as the destination node may be further shown in Table 2 to Table 4 in the following. Herein, Table 2 or information essentially including the same content as Table 2 is stored in the source node 302, Table 3 or information essentially including the same content as Table 3 is stored in the node 303, and Table 4 or information essentially including the same content as Table 4 is stored in the node 304.

TABLE 2

The correspondence table that is between the path option (302->301) and the traffic distribution ratio and that is maintained in the node 302

| (Numbers of a source node and a destination node) | Next hop node | Traffic distribution ratio |
|---|---|---|
| (302, 301) | 301 | 1/2 |
|  | 303 | 1/4 |
|  | 304 | 1/4 |

TABLE 3

The correspondence table that is between the path option (302->301) and the traffic distribution ratio and that is maintained in the node 303

| (Numbers of a source node and a destination node) | Next hop node | Traffic distribution ratio |
|---|---|---|
| (302, 301) | 301 | 1 |

TABLE 4

The correspondence table that is between the path option (302->301) and the traffic distribution ratio and that is maintained in the node 304

| (Numbers of a source node and a destination node) | Next hop node | Traffic distribution ratio |
|---|---|---|
| (302, 301) | 301 | 1 |

With reference to Table 2, for the four received packets, the source node 302 may determine a next hop node for ½ of the four packets, that is, two packets, e.g., the packet 1 and the packet 2, the next hop node determined for the packet 1 and the packet 2 is the node 301. In this example, the node 302 may directly send the packets 1 and 2 to the node 301 by using the switching-side port, and the node 301 sends the packets 1 and 2 to the external device by using the network-side port a of the node 301. The source node 302 may further determine a next hop node for ¼ of the four received packets, that is, one packet, e.g., the packet 3, the next hop node determined for the packet 3 is the node 303. In this example, the node 302 may send the packet 3 from the switching-side port of the node 302 to the node 303. With reference to Table 3, after the node 303 determines that the packet 3 from the source node 302 to the destination node 301 reaches the node 303, a next hop node can only be the node 301, the node 303 sends the packet 3 to the node 301, and the node 301 sends the packet 3 to the external device by using the network-side port a of the node 301. Likewise, the source node 302 may further determine a next hop node for ¼ of the four received packets, that is, one packet, e.g., the packet 4, the next hop node determined for the packet 4 is the node 304. In this example, the node 302 may send the packet 4 from the switching-side port of the node 302 to the node 304. With reference to Table 4, after the node 304 determines that the packet 4 from the source node 302 to the destination node 301 reaches the node 304, a next hop node can only be the node 301, the node 304 sends the packet to the node 301, and the node 301 sends the packet to the external device by using the network-side port a of the node 301. In this way, the following process can be completed: The packet 1 to the packet 4 are received from the network-side port b corresponding to the node 302, and forwarded out from the network-side port a corresponding to the node 301.

In some embodiments, the network device 300 may be specifically a network switching device, for example, a network device having a packet forwarding function such as a router or a switch. The node 301 to the node 304 may be specifically dies integrated in one or more switching chips in the network device 300.

The foregoing scenario is merely an example provided in this embodiment of this application. This embodiment of this application is not limited to the scenario.

With reference to the accompanying drawings, based on the embodiments, the following describes in detail specific implementations of the load sharing method, and a network device in the embodiments of this application.

With reference to the accompanying drawings, the network device provided in the embodiments of this application is described in detail.

A plurality of nodes in a network device are connected by using a ring network structure. Each node has only two adjacent nodes. In this example, a quantity of path options for packet forwarding between the nodes is relatively small; and therefore, pressure on a link bandwidth between the nodes is relatively large. To resolve the foregoing problem, an embodiment of this application provides a network device with a stereoscopic network structure. In other words, a plurality of nodes in the network device are connected by using the stereoscopic network structure, to increase a quantity of paths between the nodes in the network device. In this way, a requirement for a design of the link bandwidth between the nodes in the network device is reduced, and a delay of packet forwarding in the network device can be reduced through implementing load sharing on the plurality of paths.

For example, an embodiment of this application provides a network device including four nodes. A network structure of the four nodes in the network device may be specifically a tetrahedron. FIG. 3a is a schematic diagram of a structure of the network device 300. The network device 300 specifically includes a node 301, a node 302, a node 303, and a node 304. Each node is connected to three other nodes. The node 301, the node 302, the node 303, and the node 304 each correspond to one group of network-side ports. The network-side ports are configured to connect to a network-side port of another external network device. The node 301, the node 302, the node 303, and the node 304 also each correspond to three groups of switching-side ports. The switching-side ports are configured to interconnect the four nodes on a switching side.

In some embodiments, the node 301 is separately connected to the node 302, the node 303, and the node 304 by using the three groups of switching-side ports corresponding to the node 301. The node 302 is separately connected to the node 301, the node 303, and the node 304 by using the three groups of switching-side ports corresponding to the node 302. The node 303 is separately connected to the node 301, the node 302, and the node 304 by using the three groups of switching-side ports corresponding to the node 303. The node 304 is separately connected to the node 301, the node 302, and the node 303 by using the three groups of switching-side ports corresponding to the node 304.

In some embodiments, interconnection link bandwidths between any two adjacent nodes may be equal or may be not equal, and network-side bandwidths of the nodes may be equal or may be not equal. The bandwidths may be correspondingly designed based on a specific requirement for the network device. This is not specifically limited in this embodiment of this application. However, in the following embodiments, for ease of description and understanding, network devices with various structures are all described by using an example in which the interconnection link bandwidths between the adjacent nodes are equal and the network-side bandwidths of the nodes are equal.

In some embodiments, in an example, the node 301, the node 302, the node 303, and the node 304 may be packaged in one switching chip in the network device 300. In another example, the node 301, the node 302, the node 303, and the node 304 may be alternatively packaged in two switching chips in the network device 300. Each switching chip may include two nodes; or one switching chip includes one node, and the other switching chip includes three nodes. In still another example, the node 301, the node 302, the node 303, and the node 304 may be alternatively packaged in three switching chips in the network device 300. Two switching chips each include one node, and the other switching chip includes two nodes. In yet another example, the node 301, the node 302, the node 303, and the node 304 may be alternatively packaged in four switching chips in the network device 300. Each switching chip includes only one node.

For another example, an embodiment of this application further provides a network device including six nodes. A network structure of the nodes in the network device may be specifically an octahedron, or a triangular prism, or a stereoscopic network structure of a fully connected structure.

Figure 4:
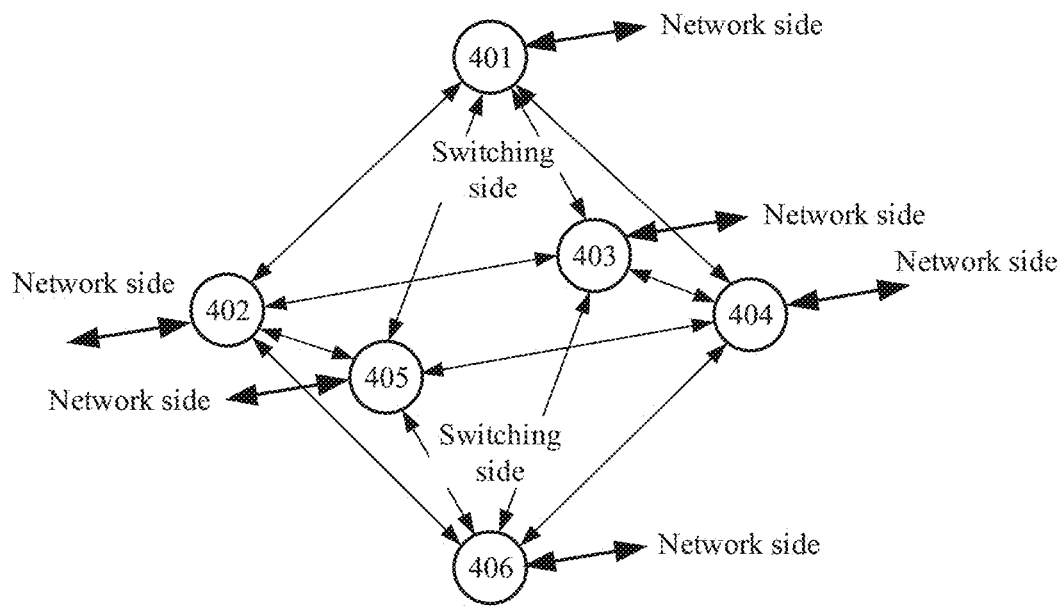
FIG. 4 is a schematic diagram of a structure of a network device 400 including six nodes according to an embodiment of this application.

FIG. 4 is a schematic diagram of a structure of a network device 400 when a network structure of nodes in the network device is an octahedron. The network device 400 specifically includes a node 401, a node 402, a node 403, a node 404, a node 405, and a node 406. Each node is connected to four of the other five nodes. The node 401, the node 402, the node 403, the node 404, the node 405, and the node 406 each correspond to one group of network-side ports. The network-side ports are configured to connect to a network-side port of another external network device. The node 401, the node 402, the node 403, the node 404, the node 405, and the node 406 also each correspond to four groups of switching-side ports. The switching-side ports are configured to interconnect to four of the other five nodes.

In some embodiments, the node 401 is separately connected to the node 402, the node 403, the node 404, and the node 405 by using the four groups of switching-side ports corresponding to the node 401. The node 402 is separately connected to the node 401, the node 403, the node 406, and the node 405 by using the four groups of switching-side ports corresponding to the node 402. The node 403 is separately connected to the node 401, the node 402, the node 406, and the node 404 by using the four groups of switching-side ports corresponding to the node 403. The node 404 is separately connected to the node 401, the node 403, the node 406, and the node 405 by using the four groups of switching-side ports corresponding to the node 404. The node 405 is separately connected to the node 401, the node 402, the node 406, and the node 404 by using the four groups of switching-side ports corresponding to the node 405. The node 406 is separately connected to the node 402, the node 403, the node 404, and the node 405 by using the four groups of switching-side ports corresponding to the node 406.

Figure 5:
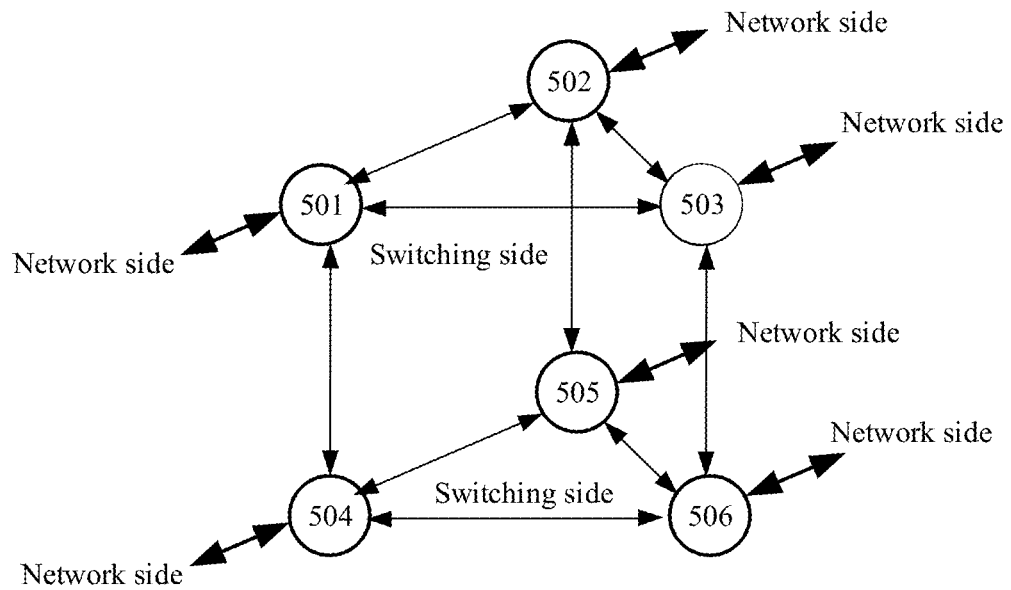
FIG. 5 is a schematic diagram of a structure of another network device 500 including six nodes according to an embodiment of this application.

FIG. 5 is a schematic diagram of a structure of a network device 500 when a network structure of nodes in the network device is a triangular prism. The network device 500 specifically includes a node 501, a node 502, a node 503, a node 504, a node 505, and a node 506. Each node is connected to three of the other five nodes. The node 501, the node 502, the node 503, the node 504, the node 505, and the node 506 each correspond to one group of network-side ports. The network-side ports are configured to connect to a network-side port of another external network device. The node 501, the node 502, the node 503, the node 504, the node 505, and the node 506 also each correspond to three groups of switching-side ports. The switching-side ports are configured to interconnect to three of the other five nodes.

In some embodiments, the node 501 is separately connected to the node 502, the node 503, and the node 504 by using the three groups of switching-side ports corresponding to the node 501. The node 502 is separately connected to the node 501, the node 503, and the node 505 by using the three groups of switching-side ports corresponding to the node 502. The node 503 is separately connected to the node 501, the node 502, and the node 506 by using the three groups of switching-side ports corresponding to the node 503. The node 504 is separately connected to the node 501, the node 506, and the node 505 by using the three groups of switching-side ports corresponding to the node 504. The node 505 is separately connected to the node 502, the node 506, and the node 504 by using the three groups of switching-side ports corresponding to the node 505. The node 506 is separately connected to the node 503, the node 504, and the node 505 by using the three groups of switching-side ports corresponding to the node 506.

Figure 6:
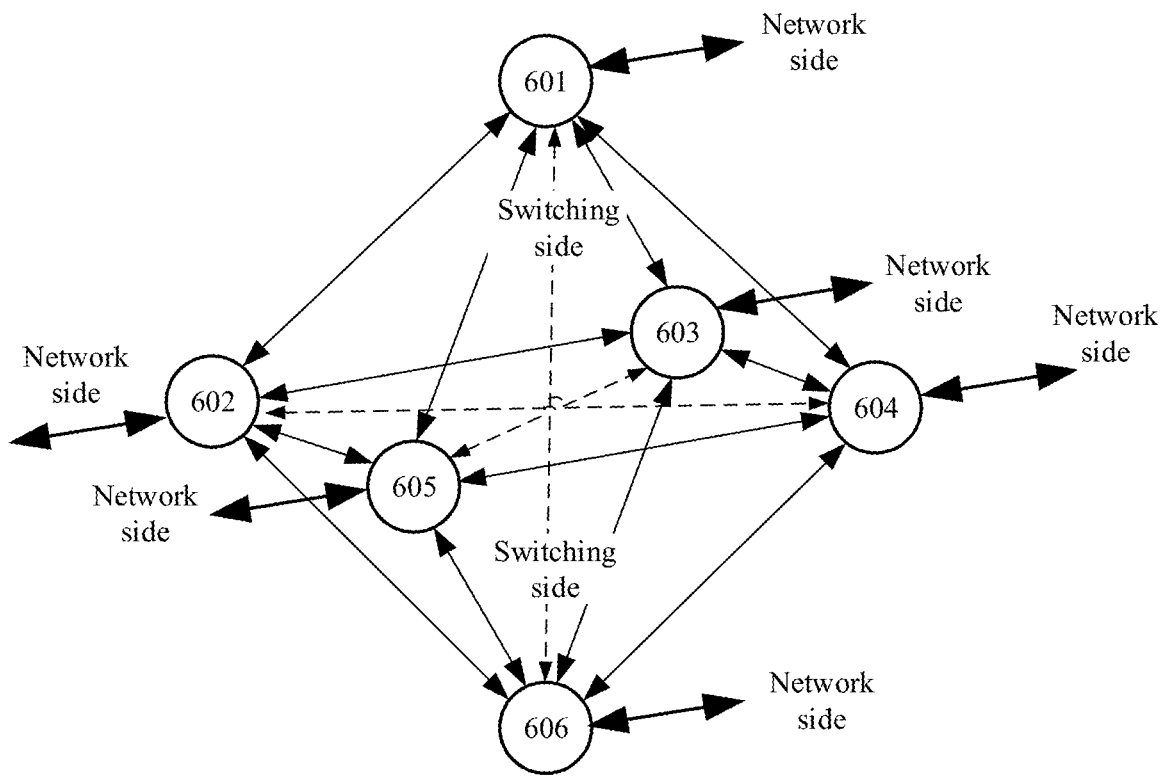
FIG. 6 is a schematic diagram of a structure of still another network device 600 including six nodes according to an embodiment of this application.

FIG. 6 is a schematic diagram of a structure of a network device 600 when a network structure of nodes in the network device is a fully connected stereoscopic network structure. In the network device 600, diagonal nodes in FIG. 4 may be connected, or diagonal nodes in FIG. 5 may be connected. The network device 600 specifically includes a node 601, a node 602, a node 603, a node 604, a node 605, and a node 606. Each node is connected to the other five nodes. The node 601, the node 602, the node 603, the node 604, the node 605, and the node 606 each correspond to one group of network-side ports. The network-side ports are configured to connect to a network-side port of another external network device. The node 601, the node 602, the node 603, the node 604, the node 605, and the node 606 also each correspond to five groups of switching-side ports. The switching-side ports are configured to interconnect to the other five nodes.

In some embodiments, the node 601 is separately connected to the node 602, the node 603, the node 604, the node 605, and the node 606 by using the five groups of switching-side ports corresponding to the node 601. The node 602 is separately connected to the node 601, the node 603, the node 604, the node 605, and the node 606 by using the five groups of switching-side ports corresponding to the node 602. The node 603 is separately connected to the node 601, the node 602, the node 604, the node 605, and the node 606 by using the five groups of switching-side ports corresponding to the node 603. The node 604 is separately connected to the node 601, the node 602, the node 603, the node 605, and the node 606 by using the five groups of switching-side ports corresponding to the node 604. The node 605 is separately connected to the node 601, the node 602, the node 603, the node 604, and the node 606 by using the five groups of switching-side ports corresponding to the node 605. The node 606 is separately connected to the node 601, the node 602, the node 603, the node 604, and the node 605 by using the five groups of switching-side ports corresponding to the node 606.

For still another example, an embodiment of this application further provides a network device including eight nodes. A network structure of the nodes in the network device may be specifically a hexahedron or a stereoscopic network structure of a fully connected structure.

Figure 7:
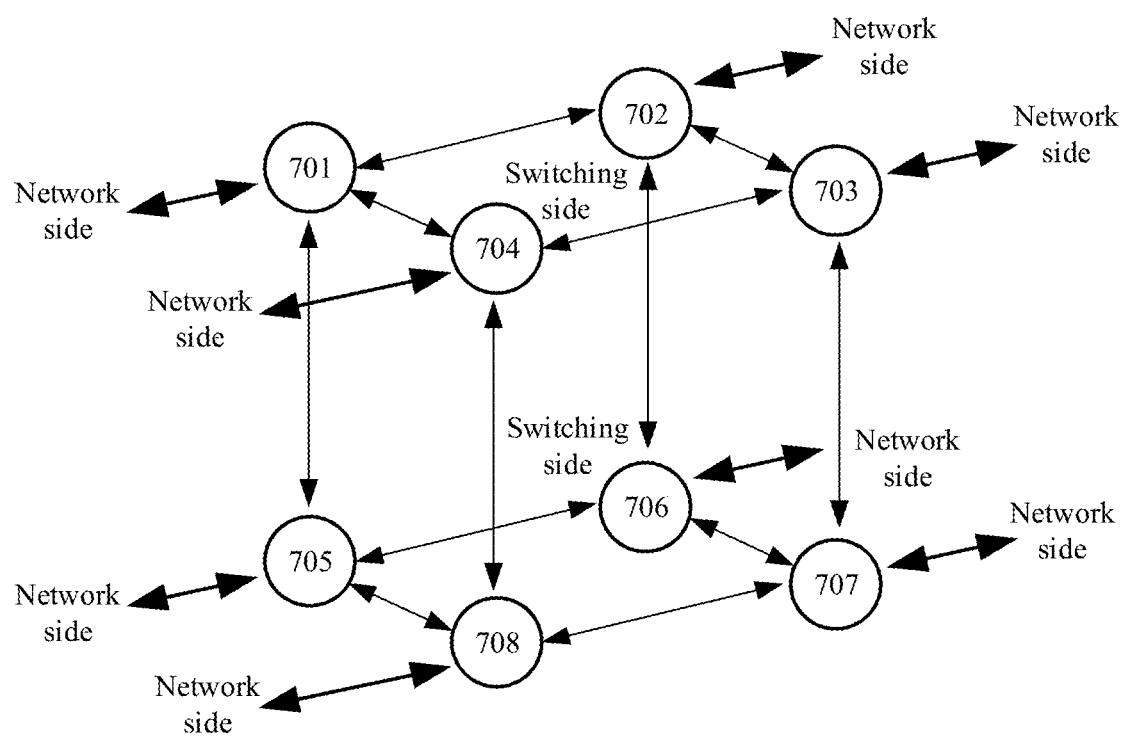
FIG. 7 is a schematic diagram of a structure of a network device 700 including eight nodes according to an embodiment of this application.

FIG. 7 is a schematic diagram of a structure of a network device 700 when a network structure of nodes in the network device is a cube. The network device 700 specifically includes a node 701, a node 702, a node 703, a node 704, a node 705, a node 706, a node 707, and a node 708. Each node is connected to three of the other seven nodes. The node 701, the node 702, the node 703, the node 704, the node 705, the node 706, the node 707, and the node 708 each correspond to one group of network-side ports. The network-side ports are configured to connect to a network-side port of another external network device. The node 701, the node 702, the node 703, the node 704, the node 705, the node 706, the node 707, and the node 708 also each correspond to three groups of switching-side ports. The switching-side ports are configured to interconnect to three of the other seven nodes.

In some embodiments, the node 701 is separately connected to the node 702, the node 704, and the node 705 by using the three groups of switching-side ports corresponding to the node 701. The node 702 is separately connected to the node 701, the node 703, and the node 706 by using the three groups of switching-side ports corresponding to the node 702. The node 703 is separately connected to the node 702, the node 704, and the node 707 by using the three groups of switching-side ports corresponding to the node 703. The node 704 is separately connected to the node 701, the node 703, and the node 708 by using the three groups of switching-side ports corresponding to the node 704. The node 705 is separately connected to the node 701, the node 706, and the node 708 by using the three groups of switching-side ports corresponding to the node 705. The node 706 is separately connected to the node 702, the node 705, and the node 707 by using the three groups of switching-side ports corresponding to the node 706. The node 707 is separately connected to the node 703, the node 706, and the node 708 by using the three groups of switching-side ports corresponding to the node 707. The node 708 is separately connected to the node 704, the node 705, and the node 707 by using the three groups of switching-side ports corresponding to the node 708.

Figure 8:
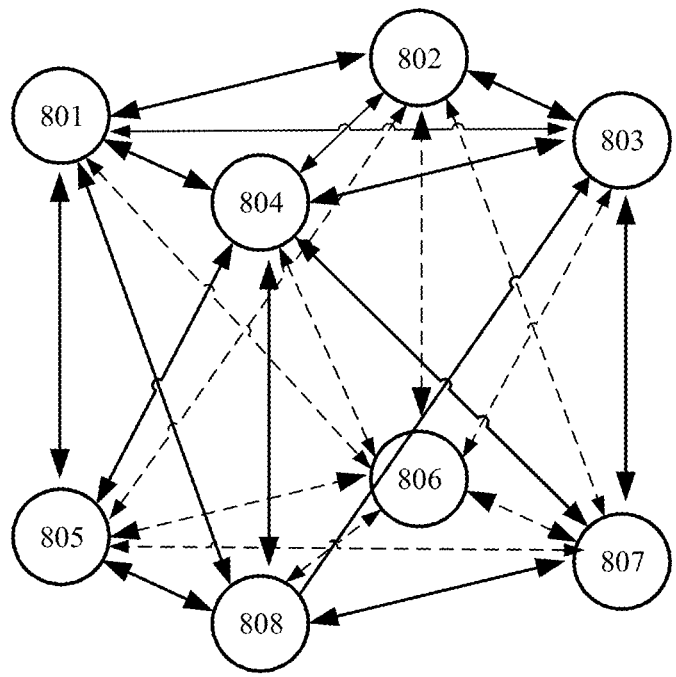
FIG. 8 is a schematic diagram of a structure of another network device 800 including eight nodes according to an embodiment of this application.

FIG. 8 is a schematic diagram of a structure of a network device 800 when a network structure of nodes in the network device is a fully connected stereoscopic network structure. In the network device 800, diagonal nodes in FIG. 7 may be connected. The network device 800 specifically includes a node 801, a node 802, a node 803, a node 804, a node 805, a node 806, a node 807, and a node 808. Each node is connected to the other seven nodes. The node 801, the node 802, the node 803, the node 804, the node 805, the node 806, the node 807, and the node 808 each correspond to one group of network-side ports. The network-side ports are configured to connect to a network-side port of another external network device. The node 801, the node 802, the node 803, the node 804, the node 805, the node 806, the node 807, and the node 808 also each correspond to seven groups of switching-side ports. The switching-side ports are configured to interconnect to the other seven nodes.

In some embodiments, the node 801 is separately connected to the node 802, the node 803, the node 804, the node 805, the node 806, the node 807, and the node 808 by using the seven groups of switching-side ports corresponding to the node 801. The node 802 is separately connected to the node 801, the node 803, the node 804, the node 805, the node 806, the node 807, and the node 808 by using the seven groups of switching-side ports corresponding to the node 802. The node 803 is separately connected to the node 801, the node 802, the node 804, the node 805, the node 806, the node 807, and the node 808 by using the seven groups of switching-side ports corresponding to the node 803. The node 804 is separately connected to the node 801, the node 802, the node 803, the node 805, the node 806, the node 807, and the node 808 by using the seven groups of switching-side ports corresponding to the node 804. The node 805 is separately connected to the node 801, the node 802, the node 803, the node 804, the node 806, the node 807, and the node 808 by using the seven groups of switching-side ports corresponding to the node 805. The node 806 is separately connected to the node 801, the node 802, the node 803, the node 804, the node 805, the node 807, and the node 808 by using the seven groups of switching-side ports corresponding to the node 806. The node 807 is separately connected to the node 801, the node 802, the node 803, the node 804, the node 805, the node 806, and the node 808 by using the seven groups of switching-side ports corresponding to the node 807. The node 808 is separately connected to the node 801, the node 802, the node 803, the node 804, the node 805, the node 806, and the node 807 by using the seven groups of switching-side ports corresponding to the node 808.

In some embodiments, the network device with the stereoscopic network structure provided in the foregoing embodiments is merely an example network device. The network device provided in the embodiments of this application may also have a stereoscopic network structure in any form including five nodes, seven nodes, nine nodes, ten nodes, or the like. The network structure may be symmetrical or asymmetrical. This is not specifically limited in the embodiments of this application.

In comparison with a ring network structure including a plurality of nodes, in the network device with the stereoscopic network structure provided in the embodiments of this application, a quantity of links between each node and another node in the network device including the same quantity of nodes is increased, to increase a quantity of paths between the nodes in the network device. In this way, when a switching capability of the network device is improved through increasing the quantity of nodes in the network device, a requirement for a design of the link bandwidth between the nodes in the network device can be reduced, and a delay of packet forwarding in the network device can be reduced through implementing load sharing on a plurality of optional paths.

After the descriptions of several types of network devices with stereoscopic network structures including nodes provided in the embodiments of this application, with reference to the accompanying drawings, the following describes in detail the load sharing by applying the equivalent resistance method provided in the embodiments of this application to the network device.

When the load sharing is implemented by using the shortest path first algorithm, only a shortest path is selected for packet forwarding on each node in the network device. In this example, traffic is excessively large on some paths, while traffic is excessively small on other paths or other paths may even be idle for a long time. Consequently, the network device cannot implement balanced traffic forwarding. In addition, if a network device including a relatively large quantity of nodes is designed, based on the shortest path first algorithm, the traffic cannot be adequately distributed to a plurality of paths, and a relatively large link bandwidth may need to be designed between the plurality of nodes. It is difficult to design the link bandwidth for the network device including the plurality of nodes. On this basis, this embodiment of this application proposes to implement the load sharing between the nodes in the network device by using the equivalent resistance method.

Before the description of applying the equivalent resistance method to the load sharing in the network device, circuit design background, such as the Kirchhoff voltage law and Kirchhoff current law is briefly described.

Figure 9:
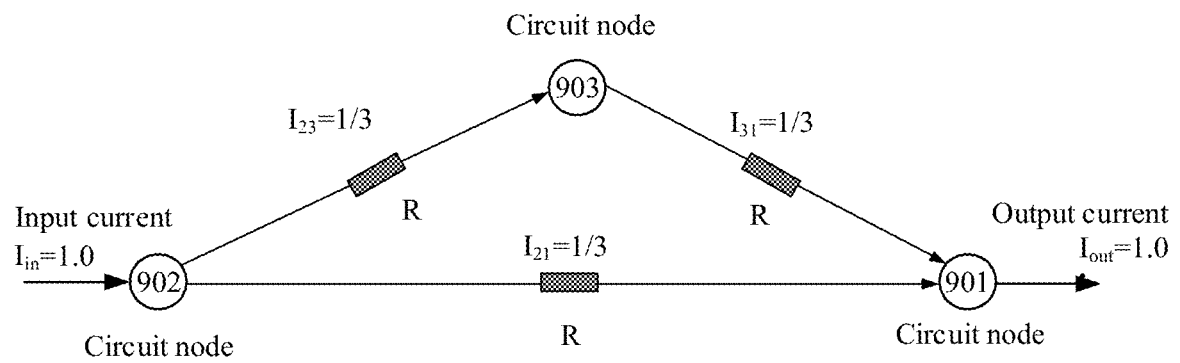
FIG. 9 is a schematic diagram of a structure of a resistor network including three circuit nodes according to an embodiment of this application.

FIG. 9 is a schematic diagram of a structure of a resistor network. The resistor network includes a circuit node 901, a circuit node 902, and a circuit node 903. Each circuit node is represented by using a circle to facilitate a correspondence between a circuit node and a node in a network device. The circle does not indicate any circuit module. An equivalent resistor R with the same resistance value exists between any two circuit nodes. It is assumed that the circuit node 902 is connected to a high voltage and the circuit node 901 is connected to a low voltage. In this example, a current with a magnitude of 1.0 may flow from the circuit node 902 to the circuit node 901. In some embodiments, a principle of selecting a path for the current in the resistor network in the physics and dividing the current based on resistance of a resistor on each path is applied to load sharing in this embodiment of this application. A specific magnitude of the current is not concerned. The 1.0 current is only used for indicating a subsequent current distribution ratio. The 1.0 current may be specifically 10 amperes, 100 amperes, or any other current value.

With reference to the resistor network shown in FIG. 9, a current flowing through each equivalent resistor may be analyzed and calculated based on knowledge of the physics/the basic circuit technology. In specific implementation, the following equation (1) may be obtained for the circuit node 902, and the following equation (2) may be obtained for the circuit node 903, based on the Kirchhoff current law: A sum of input currents of any circuit node in a circuit is equal to a sum of output currents of the circuit node.

$$I_{23} + I_{21} = I_{in} = 1.0 \quad (1)$$

$$I_{23} = I_{31} \quad (2)$$

The following equation (3) may be obtained for two paths from the circuit node 902 to the circuit node 901 based on the Kirchhoff voltage law: Voltages on a plurality of paths between any two circuit nodes in a circuit are equal.

$$R * I_{23} + R * I_{31} = R * I_{21} \quad (3)$$

Based on the foregoing equations (1), (2), and (3), magnitudes of currents flowing through the three resistors R may be calculated: $I_{23}=\frac{1}{3}$, $I_{31}=\frac{1}{3}$, and $I_{21}=\frac{2}{3}$. The current magnitudes $\frac{1}{3}$ and $\frac{2}{3}$ may also be considered as ratios in which the current flows through the equivalent resistors. For example, if three currents flow into the resistor network from the circuit node 902, two currents directly flow from the circuit node 902 to the circuit node 901, and one current flows from the circuit node 902 to the circuit node 901 through the circuit node 903.

Regardless of complexity of the resistor network, a group of equations may be obtained based on the Kirchhoff voltage law and the Kirchhoff current law, to calculate a magnitude (or a ratio) of the current flowing through each equivalent resistor in the resistive network.

Circuit knowledge such as the Kirchhoff voltage law and the Kirchhoff current law is applied to the network device to implement load sharing. It may be essentially considered to: indicate a bandwidth between the nodes in the network device by using an equivalent resistance in the resistor network; and indicate a traffic distribution ratio when load sharing is implemented on the nodes in the network device, by using a calculated ratio relationship of a magnitude of a current flowing through each equivalent resistor.

Figure 10:
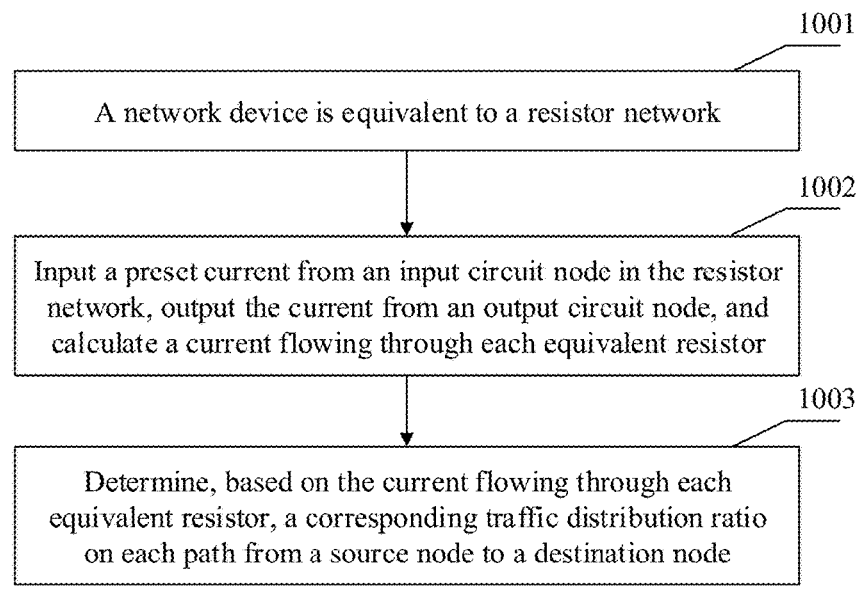
FIG. 10 is a schematic flowchart of load sharing by using an equivalent resistance method according to an embodiment of this application.

In some embodiments, refer to a schematic flowchart shown in FIG. 10. Implementing load sharing by using an equivalent resistance method may specifically include the following block 1001 to block 1003:

Block 1001: A network device is equivalent to a resistor network.

In some embodiments, that the network device is equivalent to the resistor network may specifically include: S11. Determine a source node and a destination node in the network device, use the source node in the network device as an input circuit node, and use the destination node as an output circuit node. S12. Each node in the network device is equivalent to one circuit node. S13. Determine an equivalent resistance on a corresponding path in the resistor network based on a link bandwidth between the nodes in the network device, and determine a corresponding equivalent resistor between the circuit nodes in the resistor network.

In some embodiments, a value of an equivalent resistance is inversely proportional to a link bandwidth. To be specific, when a link bandwidth between two nodes is relatively large, an equivalent resistor with a relatively small resistance value needs to be set between circuit nodes corresponding to the two nodes. On the contrary, when a link bandwidth between two nodes is relatively small, an equivalent resistor with a relatively large resistance value needs to be set between circuit nodes corresponding to the two nodes. In an example, if the link bandwidths between the nodes in the network device are equal, the determined resistance values of the equivalent resistors set in block S13 are equal. In another example, if the link bandwidths between the two nodes are not equal, equivalent resistors with different resistance values may be set on corresponding paths in the resistor network based on link bandwidth ratios between the nodes. A resistance value ratio of a corresponding equivalent resistor is inversely proportional to a bandwidth ratio.

For example, the network device 400 shown in FIG. 4 is used as an example. It is assumed that the link bandwidths between the adjacent nodes are equal. In this example, a process in which the network device 400 is equivalent to a resistor network 1100 shown in FIG. 11 may specifically include: Block 1: Determine the source node 402 and the destination node 401 in the network device 400, use the source node 402 in the network device as an input circuit node 1102, and use the destination node 401 as an output circuit node 1101. Block 2: Each of the nodes 403 to 406 in the network device 400 is equivalent to one of circuit nodes 1103 to 1106. Block 3: Because the link bandwidths between the nodes in the network device 400 are equal, equivalent resistors R with the same resistance value are set between the circuit nodes in the resistor network 1100.

Block 1002: Input a preset current from the input circuit node in the resistor network, output the current from the output circuit node, and calculate a current flowing through each equivalent resistor.

For example, the network device 400 shown in FIG. 4 is used as an example. A 1.0 current may be input from the circuit resistor node 1102 in the resistor network 1100, and output from the output circuit node 1101. A current flowing through each equivalent resistor R is calculated based on the Kirchhoff voltage law and the Kirchhoff current law. For details, refer to 12 current values shown in FIG. 11.

Block 1003: Determine, based on the current flowing through each equivalent resistor, a corresponding traffic distribution ratio on each path from the source node to the destination node.

In some embodiments, when the network device is equivalent to the resistor network, a resistance value of an equivalent resistor between circuit nodes in the corresponding resistor network is set based on a link bandwidth between the nodes in the network device. Herein, the resistance value of the equivalent resistor is inversely proportional to the link bandwidth. When a link bandwidth between two nodes is relatively large, an equivalent resistor with a relatively small resistance value needs to be set between circuit nodes corresponding to the two nodes. In this example, a current flowing through the equivalent resistor with the relatively small resistance value is relatively large. In other words, it may be determined that the relatively large link bandwidth between the two nodes corresponds to a relatively large traffic distribution ratio. On the contrary, when a link bandwidth between two nodes is relatively small, an equivalent resistor with a relatively large resistance value needs to be set between circuit nodes corresponding to the two nodes. In this example, a current flowing through the equivalent resistor with the relatively large resistance value is relatively small. In other words, it may be determined that the relatively small link bandwidth between the two nodes corresponds to a relatively small traffic distribution ratio. That is, the link bandwidth between the two nodes may be directly proportional to the calculated traffic distribution ratio of the link.

In an example, the determined traffic distribution ratio corresponding to each path from the source node to the destination node may be specifically a traffic distribution ratio corresponding to each complete path option from the source node to the destination node. If the complete path option includes an intermediate node, the traffic distribution ratio corresponding to the complete path option is a minimum value of a traffic distribution ratio corresponding to each link between every two adjacent nodes in the complete path option. In another example, the traffic distribution ratio may be alternatively a traffic distribution ratio corresponding to a possible next hop node of a current node from the source node to the destination node, that is, a traffic distribution ratio corresponding to a link from the current node to the next hop node.

For example, the network device 400 shown in FIG. 4 is still used as an example. A value of a current flowing through each equivalent resistor R in the resistor network shown in FIG. 11 may be used for determining a traffic distribution ratio corresponding to a link between two corresponding nodes in the network device, where circuit nodes at two ends of the equivalent resistor R correspond to the nodes in the network device.

For example, a correspondence table between a path option: the node 402→the node 401 and a traffic distribution ratio shown in the following Table 5 may be obtained.

TABLE 5

The correspondence table between the path option: the node 402->the node 401 and the traffic distribution ratio

| Number of a destination node | Path option | Traffic distribution ratio |
| --- | --- | --- |
| 401 | 402->401 | 10/24 |
|  | 402->403->401 | 5/24 |
|  | 402->405->401 | 5/24 |
|  | 402->406->403->404->401 | 1/24 |
|  | 402->406->405->404->401 | 1/24 |
|  | 402->406->404->401 | 2/24 |

For the path option 402→406→404→401, a process for determining the traffic distribution ratio corresponding to the path option may be specifically: selecting, as the traffic distribution ratio corresponding to the path option, a minimum value 2/24 from a traffic distribution ratio 4/24 corresponding to a link from the node 402 to the node 406, a traffic distribution ratio 2/24 corresponding to a link from the node 406 to the node 404, and a traffic distribution ratio 5/24 corresponding to a link from the node 404 to the node 401.

Figure 11:
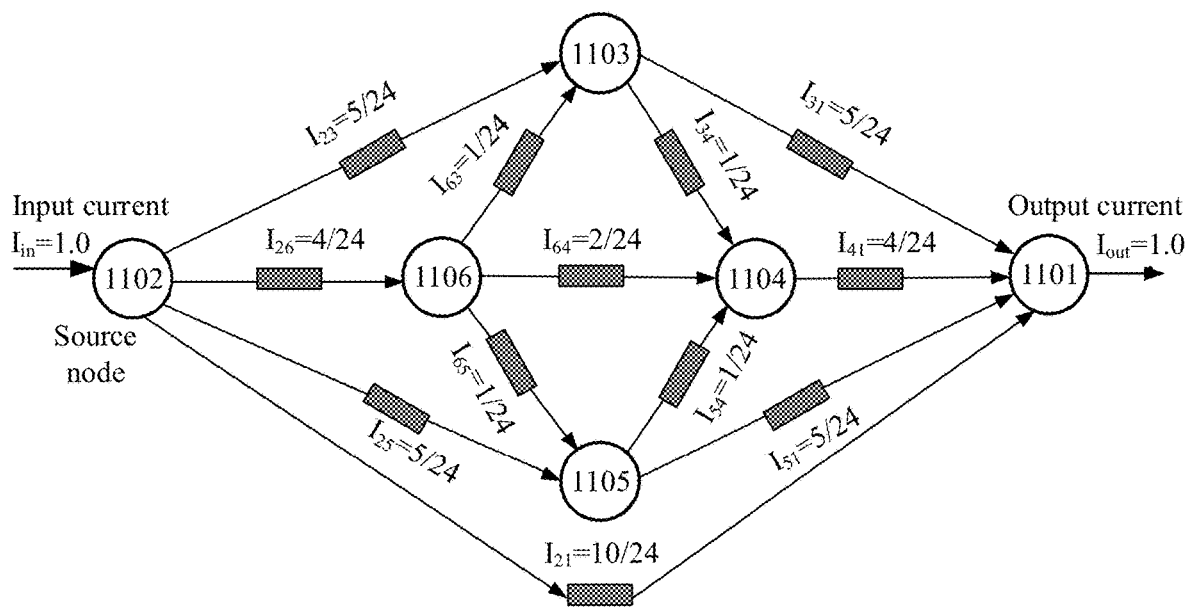
FIG. 11 is a schematic diagram of a structure of a resistor network 1100 corresponding to the network device 400 according to an embodiment of this application.

In some embodiments, many paths from the node 402 to the node 401 may be obtained through calculation. A combination of some path options may be used as a basis for indicating packaging forwarding of a packet from the node 402 to the node 401. In other words, the path options in Table 5 indicate merely the combination of some optional paths from the node 402 to the node 401 and the corresponding traffic distribution ratios. In some embodiments, a correspondence that is between a path option and a traffic distribution ratio and that is stored in a node meets the following conditions: Condition 1: A sum of traffic distribution ratios corresponding to all path options with the same source node and the same destination node is not greater than 1. Condition 2: A sum of traffic distribution ratios corresponding to all path options including the same node pair should be less than or equal to a traffic distribution ratio corresponding to a link between the node pair. For example, for Condition 2, Table 5 includes a direct path from the node 404 to the node 401. In this example, (404, 401) may be considered as one node pair. The following three paths in Table 5 all include this node pair, and the traffic distribution ratios corresponding to the following three paths are 1/24+1/24+2/24=4/24 before. With reference to FIG. 11, it may be learned that the corresponding traffic distribution ratio from the node 404 to the node 401 is 4/24 after calculation by using an equivalent resistance method. Therefore, the following three paths may be all stored in Table 5, and Table 5 does not include a path including the node pair (404, 401).

In some embodiments, for each node in the network device 400, for example, the node 402, the node 402 further needs to store a correspondence between a corresponding path option and a corresponding traffic distribution ratio in a case in which the node 402 is the source node and each of the other five nodes serves as the destination node, besides Table 5 or information including the same content as Table 5. The correspondence between the path option and the traffic distribution ratio in a case in which the node 402 is the source node and each of the other five nodes serves as the destination node may be obtained through calculation in the manner shown in block 1001 to block 1003.

For another example, another correspondence table between a path option: the node 402→the node 401 and a traffic distribution ratio shown in the following Table 6 may be alternatively obtained.

TABLE 6

The correspondence table between the path option: the node 402->the node 401 and the traffic distribution ratio

| (Numbers of a source node and a destination node) | Next hop node | Traffic distribution ratio |
| --- | --- | --- |
| (402, 401) | 401 | 10/24 |
|  | 403 | 5/24 |
|  | 405 | 5/24 |
|  | 406 | 4/24 |

Table 6 shows a possible case of a next hop node of the node 402 and a corresponding traffic distribution ratio in a case in which the source node is the node 402 and the destination node is the node 401, wherein the possible next hop node of the node 402 is a node that a packet passing through the node 402 may passes though. When the next hop node is the node 401, the traffic distribution ratio corresponding to the path option may be specifically a traffic distribution ratio 10/24 corresponding to a link from the node 402 to the node 401. When the next hop node is the node 403, the traffic distribution ratio corresponding to the path option may be specifically a traffic distribution ratio 5/24 corresponding to a link from the node 402 to the node 403.

In some embodiments, for each node in the network device 400, for example, the node 402, the node 402 further needs to store a correspondence between a possible next hop node of the current node 402 and a traffic distribution ratio in a case in which any two nodes serve as the source node and the destination node, besides Table 6 or information including the same content as Table 6, wherein the possible next hop node of the current node 402 is a node that a packet passing through the current node 402 may passes though. The node 403 also needs to store a correspondence between a possible next hop node of the node 403 and a traffic distribution ratio in a case in which the source node is the node 402 and the destination node is the node 401, wherein the possible next hop node of the node 403 is a node that a packet passing through the node 403 may passes though. Likewise, the node 405 also needs to store a correspondence between a possible next hop node of the node 405 and a traffic distribution ratio in a case in which the source node is the node 402 and the destination node is the node 401, wherein the possible next hop node of the node 405 is a node that a packet passing through the node 405 may passes though; and the node 406 also needs to store a correspondence between a possible next hop node of the node 406 and a traffic distribution ratio in a case in which the source node is the node 402 and the destination node is the node 401, wherein the possible next hop node of the node 406 is a node that a packet passing through the node 406 may passes though.

In some embodiments, the circuit knowledge such as the Kirchhoff voltage law and the Kirchhoff current law is applied to the network device to implement load sharing. In addition to a network device with a stereoscopic network structure (for example, the various network devices with the network structures shown in FIG. 3*a*, and FIG. 4 to FIG. 8) provided in the embodiments of this application, the circuit knowledge is also applicable to a network device with a ring network structure including a plurality of nodes. For a process of calculating a correspondence between a path and a traffic distribution ratio, refer to block 1001 to block 1003. The network device 250 with the ring network structure including the eight nodes shown in FIG. 2*b* is used as an example. If the source node is the node 252, and the destination node is the node 251, a correspondence table between a path option: the node 252→the node 251 and a traffic distribution ratio shown in the following Table 7 may be obtained from the node 252; or a correspondence table between a path option: the node 252→the node 251 and a traffic distribution ratio shown in the following Table 8 may be obtained from the node 252.

TABLE 7

The correspondence table between the path option: the node 252–>the node 251 and the traffic distribution ratio

| Number of a destination node | Path option | Traffic distribution ratio |
|---|---|---|
| 251 | 252->251 | 7/8 |
|  | 252->253->254->255->256->257->258->251 | 1/8 |

TABLE 8

The correspondence table between the path option: the node 252–>the node 251 and the traffic distribution ratio

| (Numbers of a source node and a destination node) | Next hop node | Traffic distribution ratio |
|---|---|---|
| (252, 251) | 251 | 7/8 |
|  | 253 | 1/8 |

In some embodiments, the foregoing examples in the embodiments of this application show a calculation process and a calculation result when link bandwidths between the adjacent nodes in the network device are equal. If link bandwidths between adjacent nodes are not equal, an equivalent resistor with a resistance value corresponding to the bandwidth may be set according to block 1001, to implement related calculation of a traffic distribution ratio based on the bandwidth. For specific implementation, refer to the related descriptions in the foregoing embodiments.

In some embodiments, block 1001 to block 1003 may be performed by a node having a calculation function in the network device. The node may be specifically any one of nodes for forwarding a packet in the network device, or may be another node without a packet forwarding function in the network device. Alternatively, block 1001 to block 1003 may be performed by another unit (for example, a controller) outside the network device based on the network architecture including the nodes in the network device, and the another unit delivers a calculation result to the network device.

In some embodiments, for the traffic distribution ratio, the foregoing examples show merely specific shared traffic values corresponding to paths on which the traffic with the 1.0 bandwidth reaches the destination node after the traffic is input to the source node in the network device. However, it is more important to determine how to implement the load sharing on the paths based on a proportional relationship between the traffic values corresponding to the paths. It may also be considered that the proportional relationship between the traffic values corresponding to the paths is used as a basis for actually distributing the traffic.

Next, with reference to the accompanying drawings, the load sharing method provided in the embodiments of this application is described in detail.

Figure 12:
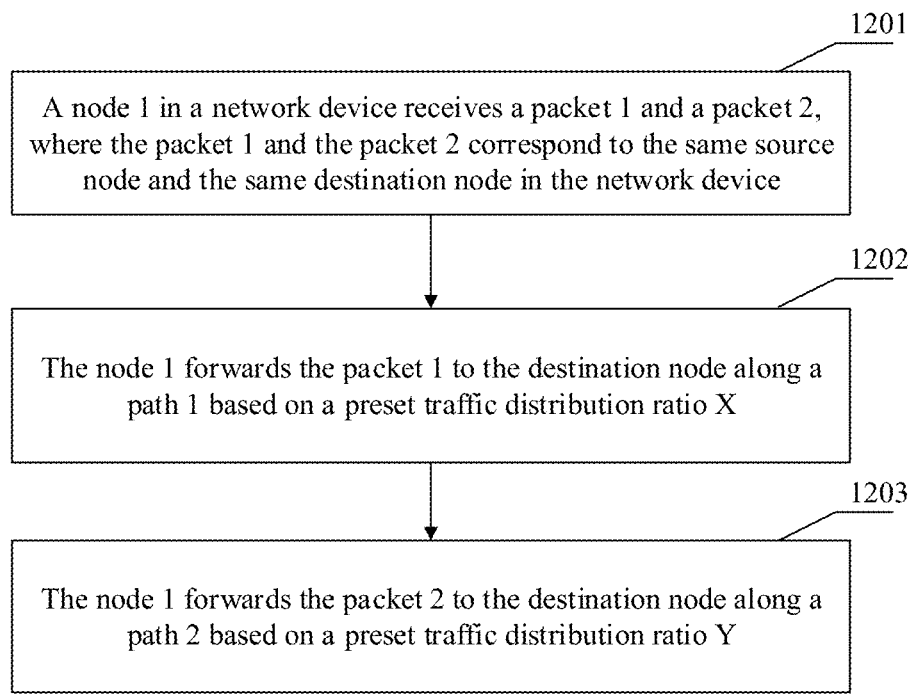
FIG. 12 is a schematic flowchart of a load sharing method according to an embodiment of this application.

FIG. 12 is a schematic flowchart of a load sharing method according to an embodiment of this application. With reference to FIG. 12, for example, the method may include the following block 1201 to block 1203.

Block 1201: A node 1 in a network device receives a packet 1 and a packet 2, where the packet 1 and the packet 2 correspond to the same source node and the same destination node in the network device.

In some embodiments, a first node that a packet reaches in the network device after the packet enters the network device from an external device by using a network-side port may be considered as a source node of the packet, and a final node through which a packet passes in the network device when the packet enters another external device by using another network-side port of the network device may be considered as a destination node of the packet. The packet 1 and the packet 2 may indicate two packets that are transmitted from an external device to the network device by using the same source node. The two packets reach another external device from the same destination node in the network device through the same path or different paths in the network device.

In some embodiments, each node in the network device has a corresponding node identifier that can be used to uniquely identify the node. The node identifier may be specifically a factory identifier that can be used to uniquely identify the node during the delivery of the node, for example, a hardware serial number or a delivery identifier; or may be an internal identifier configured for each node when the node is integrated into the network device, for example, a name or a number.

The node in the network device can recognize a node identifier and determine a node corresponding to the node identifier. In addition, the node in the network device can also recognize the destination node of the packet. This process may be specifically as follows: Based on a destination Internet protocol (IP for short) address or information corresponding to a destination IP address that is carried in the packet, the node determines the destination node corresponding to the destination IP address.

In some embodiments, the node 1 in block 1201 may be the source node of the packet 1 and the packet 2, or may be another node through which the packet 1 and the packet 2 both pass in the network device.

In some embodiments, before this embodiment is performed, the network device already obtains, through calculation based on the embodiment corresponding to FIG. 10, a traffic distribution ratio corresponding to a path option. In addition, the node 1 and another node in the network device store a correspondence between a corresponding path option and a traffic distribution ratio. The correspondence includes a correspondence between a path option and a traffic distribution ratio in various possible combinations of a source node and a destination node. The path option may be a complete path from the source node to the destination node, or may be a possible next hop node of a current node between the source node and the destination node.

In some embodiments, obtaining the correspondence between the path option and the traffic distribution ratio through calculation in the manner shown in FIG. 10 is merely an example manner of calculating the correspondence between the path option and the traffic distribution ratio. This embodiment of this application includes but is not limited to this manner. The correspondence between the path option and the traffic distribution ratio may be alternatively obtained in another proper manner.

Block 1202: The node 1 forwards the packet 1 to the destination node along a path 1 based on a preset traffic distribution ratio X.

Block 1203: The node 1 forwards the packet 2 to the destination node along a path 2 based on a preset traffic distribution ratio Y.

In some embodiments, block 1202 and block 1203 may be performed based on the correspondence that is between the path option and the traffic distribution ratio and that is stored in the node 1. The correspondence that is between the path option and the traffic distribution ratio and that is stored in the node 1 may include a correspondence 1 that is between a traffic distribution ratio and a path option and that corresponds to the source node and the destination node of the packet 1 and the packet 2. The correspondence 1 includes at least a correspondence between the path 1 and the traffic distribution ratio X and a correspondence between a path 2 and the traffic distribution ratio Y.

In an example, the path 1 and the path 2 each may indicate a complete path from the source node to the destination node. The traffic distribution ratio X and the traffic distribution ratio Y each are a minimum value of a traffic distribution ratio corresponding to a link between every two adjacent nodes on the complete path. In another case, the path 1 and the path 2 each may indicate a next hop node of the node 1 from the source node to the destination node. The traffic distribution ratio X and the traffic distribution ratio Y each are a traffic distribution ratio corresponding to a link between the node 1 and the next hop node. The traffic distribution ratio X and the traffic distribution ratio Y each may be determined by using an equivalent resistance method. For details, refer to the embodiment corresponding to FIG. 10.

In some embodiments, a transmission path may be distributed for a to-be-forwarded packet based on a current actual traffic status of each path from the source node to the destination node, to ensure that the current actual traffic status of each path from the source node to the destination node confirms to a preset traffic distribution ratio of each path from the source node to the destination node after the to-be-forwarded packet is forwarded in the network device along the distributed transmission path.

In some embodiments, the node 1 may specifically determine a granularity of the traffic distribution ratio based on any parameter of a packet quantity or a packet length. The packet length includes a length of bytes in a packet or a quantity of units in a packet. It is assumed that the path 1 and the path 2 from the source node to the destination node correspond to traffic distribution ratios: 10:1. If the granularity of the traffic distribution ratio is determined based on the packet quantity, in 11 packets received by the source node, 10 packets are forwarded along the path 1, and one packet is forwarded along the path 2. If the granularity of the traffic distribution ratio is determined based on the packet byte length, lengths of bytes successively included in five packets received by the source node are 100 bytes, 100 bytes, 200 bytes, 300 bytes, and 400 bytes. In this case, one packet with the length of 100 bytes is forwarded along the path 2, and four packets with the lengths of 100 bytes, 200 bytes, 300 bytes, and 400 bytes are forwarded along the path 1. If the granularity of the traffic distribution ratio is determined based on the packet unit quantity, quantities of units successively included in four packets received by the source node are 2, 5, 7, and 8. In this case, one packet including two packet units is forwarded along the path 2, and three packets respectively including five units, seven units, and eight units are forwarded along the path 1. It should be noted that this embodiment of this application is described by using an example in which the packet quantity is used as a basis for determining the granularity of the traffic distribution ratio. For another granularity of the traffic distribution ratio, refer to an implementation and related descriptions of dividing traffic based on a packet quantity.

In some embodiments, there is no sequence of performing block 1202 and block 1203. Block 1202 may be performed before block 1203, or block 1203 may be performed before block 1202, or block 1202 and block 1203 are performed at the same time.

Figure 13:
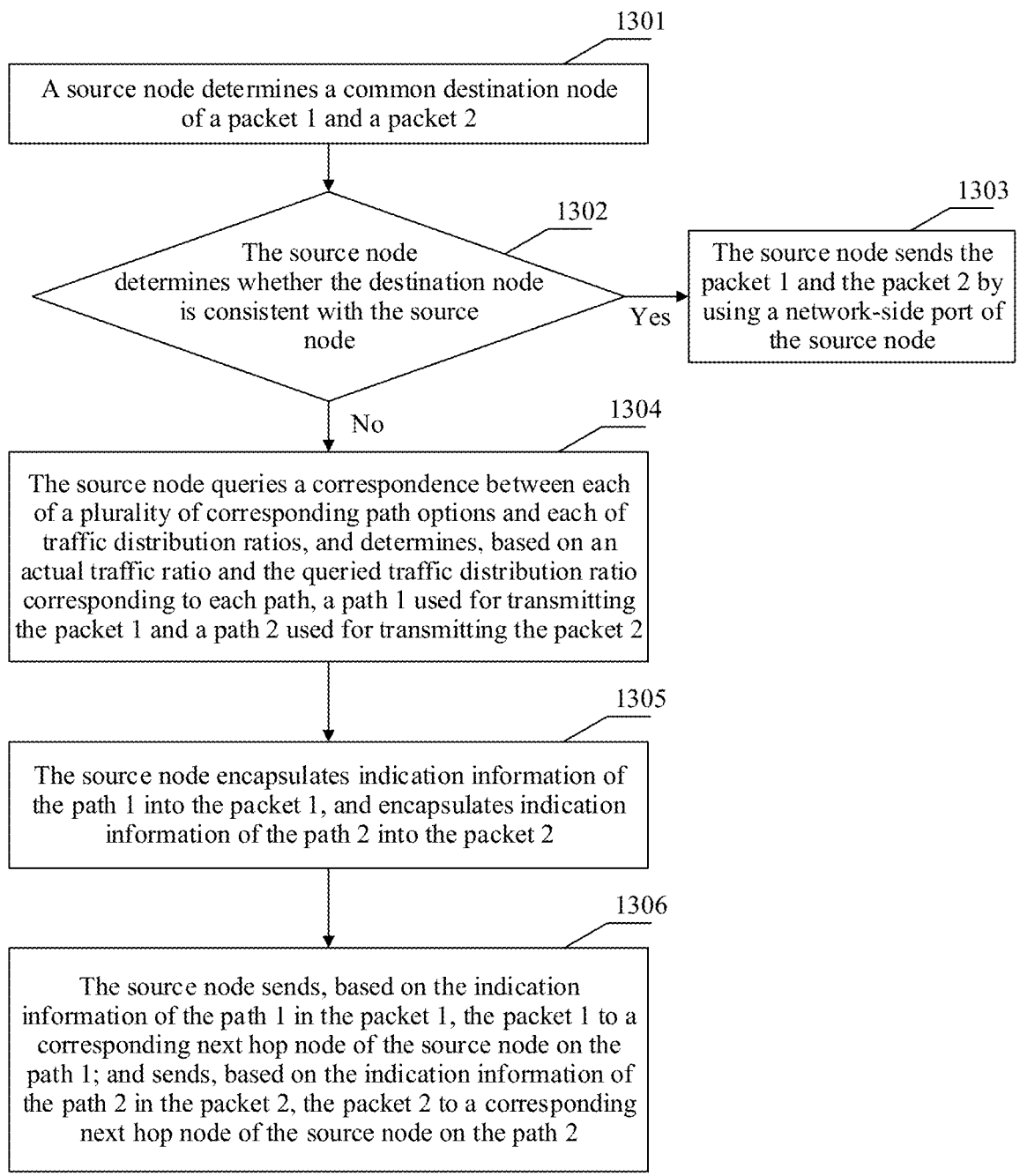
FIG. 13 is a schematic flowchart of an implementation of a load sharing method according to an embodiment of this application.

For the load sharing manner shown in FIG. 12, in some specific implementations, if the path 1 and the path 2 are complete paths from the source node to the destination node, when the node 1 is the source node, a specific process of the load sharing method may specifically include the following blocks with reference to FIG. 13.

Block 1301: The source node determines the common destination node of the packet 1 and the packet 2.

Block 1302: The source node determines whether the destination node is consistent with the source node. If the destination node is consistent with the source node, perform block 1303; or if the destination node is not consistent with the source node, perform block 1304.

Block 1303: The source node sends the packet 1 and the packet 2 by using a network-side port of the source node.

Block 1304: The source node queries a correspondence between each of a plurality of corresponding path options and each of traffic distribution ratios, and determines, based on an actual traffic ratio and the queried traffic distribution ratio corresponding to each path, the path 1 used for transmitting the packet 1 and the path 2 used for transmitting the packet 2.

For example, the network device 400 is used as an example. It is assumed that the source node of the packet 1 and the packet 2 is the node 402, and the destination node of the packet 1 and the packet 2 is the node 401. The node 402 stores at least Table 5 or information including the same content as Table 5. On six possible paths from the source node 402 to the destination node 401 in the network device 400, it is assumed that currently 10 packets, 5 packets, 5 packets, 1 packet, and 1 packet are respectively forwarded on the first four paths and the sixth path (in the sequence shown in Table 5) based on the traffic distribution ratios corresponding to the first four paths and the sixth path. Herein, 22 packets in total are forwarded. In this case, after the node 402 receives the packet 1 and the packet 2, the node 402 determines that, based on actual traffic ratios of the six paths (that is, 10:5:5:1:0:1) and the corresponding traffic distribution ratios in Table 5 (that is, 10:5:5:1:1:2), the packet 1 may be forwarded to the destination node 401 by using the fifth path (that is, 402→406→405→404→401) and the packet 2 may be forwarded to the destination node 401 by using the sixth path (that is, 402→406→404→401).

Block 1305: The source node encapsulates indication information of the path 1 into the packet 1, and encapsulates indication information of the path 2 into the packet 2.

In some embodiments, the indication information of the path 1 may be used to indicate each hop node on the path 1 from the source node to the destination node. Specifically, the indication information of the path 1 may successively include node identifiers of intermediate nodes in a sequence of forwarding the packet on the path 1. Likewise, the indication information of the path 2 may be used to indicate each hop node on the path 2 from the source node to the destination node. Specifically, the indication information of the path 2 may successively include node identifiers of intermediate nodes in a sequence of forwarding the packet on the path 2.

In this implementation, in block 1305, the source node may encapsulate the indication information of the path 1 into a packet header of the packet 1. For example, the node 1 may encapsulate a node identifier of each intermediate node on the path 1 into the packet header of the packet 1 in a form of a label stack.

For example, the network device 400 is used as an example. In the example in block 1304, the source node 402 may encapsulate a label stack including 406, 405, and 404 into the packet header of the packet 1. The sequence of the node identifiers in the label stack may be reversed, provided that each node on the path 1 can recognize and sequentially forward the packet 1. Likewise, the source node 402 may encapsulate a label stack including 406 and 404 into a packet header of the packet 2.

Block 1306: The source node sends, based on the indication information of the path 1 in the packet 1, the packet 1 to a corresponding next hop node of the source node on the path 1; and sends, based on the indication information of the path 2 in the packet 2, the packet 2 to a corresponding next hop node of the source node on the path 2.

For example, the network device 400 is used as an example. In the example in block 1305, the node 402 sends, based on the label 406 in the label stack, the packet 1 from a switching-side port of the node 402 to the node 406 corresponding to the label 406. Likewise, the node 402 sends, based on the label 406 in the label stack, the packet 2 from the switching-side port of the node 402 to the node 406 corresponding to the label 406.

In some embodiments, if no intermediate node exists on the path 1 and path 2 that are determined in block 1304 (that is, forwarding is directly implemented from the source node to the destination node), block 1305 may be not performed. A corresponding packet may be directly sent to the destination node.

Figure 14:
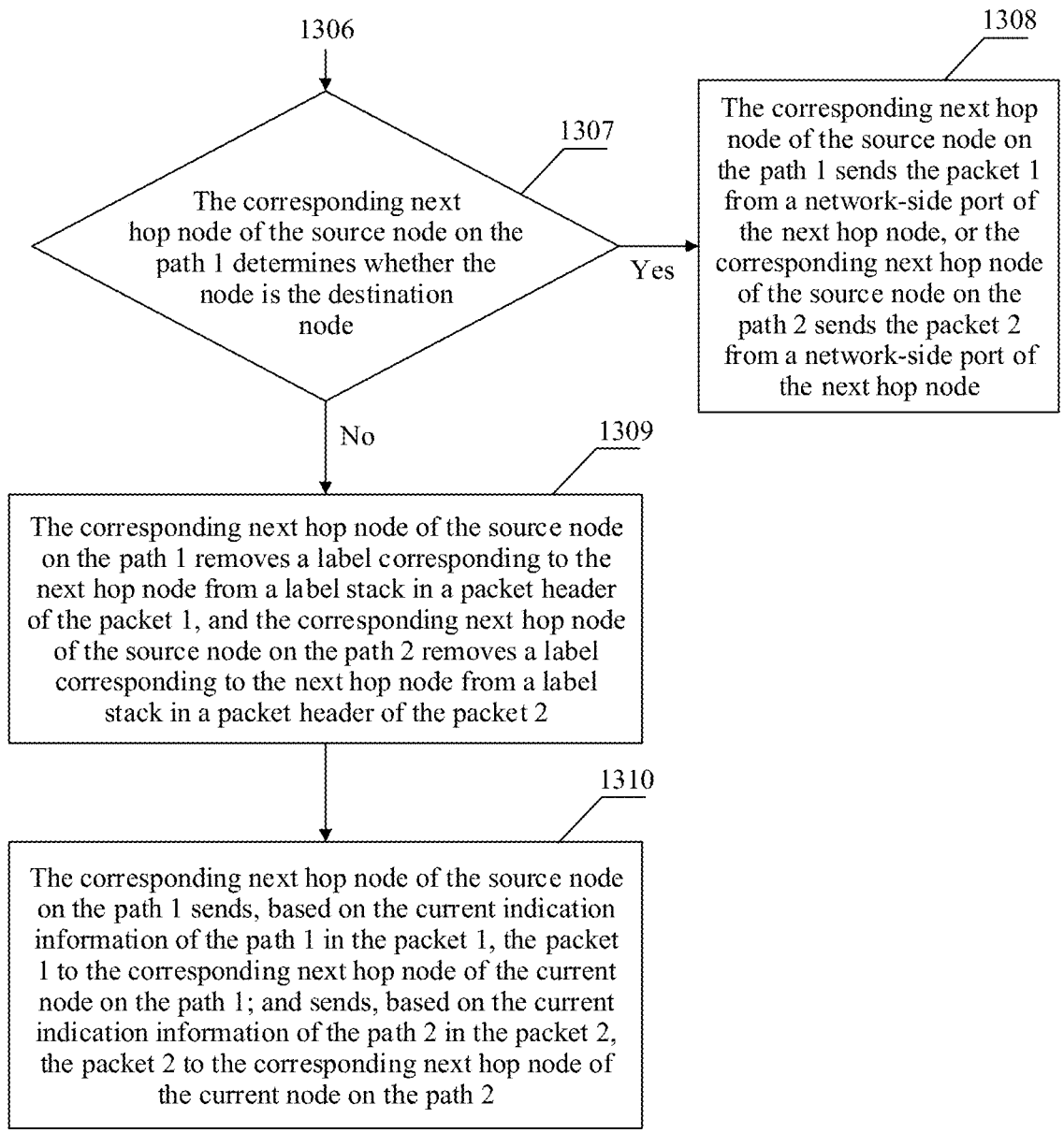
FIG. 14 is a schematic flowchart of another implementation of a load sharing method according to an embodiment of this application.

When the paths determined in block 1304 include an intermediate node, after block 1306 is completed, this embodiment of this application may further include a part in which each intermediate node forwards the received packet to the destination node based on the label stack in the packet header of the packet. In other words, after block 1306, as shown in FIG. 14, this embodiment of this application may further include the following blocks:

Block 1307: The corresponding next hop node of the source node on the path 1 determines whether the node is the destination node. If the node is the destination node, perform block 1308; or if the node is not the destination node, perform block 1309. Likewise, the corresponding next hop node of the source node on the path 2 determines whether the node is the destination node. If the node is the destination node, perform block 1308; or if the node is not the destination node, perform block 1309.

Block 1308: The corresponding next hop node of the source node on the path 1 sends the packet 1 from a network-side port of the next hop node, or the corresponding next hop node of the source node on the path 2 sends the packet 2 from a network-side port of the next hop node.

Block 1309: The corresponding next hop node of the source node on the path 1 removes a label corresponding to the next hop node from the label stack in the packet header of the packet 1, and the corresponding next hop node of the source node on the path 2 removes a label corresponding to the next hop node from the label stack in the packet header of the packet 2.

For example, the network device 400 is used as an example. In the example in block 1306, after receiving the packet 1, the node 406 removes the label 406 from the label stack in the packet header of the packet 1. In this case, the label stack in the packet header of the packet 1 includes labels of the intermediate nodes 405 and 404. Likewise, after receiving the packet 2, the node 406 removes the label 406 from the label stack in the packet header of the packet 2. In this case, the label stack in the packet header of the packet 2 includes only the label of the intermediate node 404.

Block 1310: The corresponding next hop node of the source node on the path 1 sends, based on the current indication information of the path 1 in the packet 1, the packet 1 to the corresponding next hop node of the current node on the path 1; and the corresponding next hop node of the source node on the path 2 sends, based on the current indication information of the path 2 in the packet 2, the packet 2 to the corresponding next hop node of the current node on the path 2.

For example, the network device 400 is used as an example. In the example in block 1309, the node 406 sends, based on the label 404 in the label stack, the packet 1 from a switching-side port of the node 406 to the node 405 corresponding to the label 405. Likewise, the node 406 sends, based on the label 404 in the label stack, the packet 2 from the switching-side port of the node 406 to the node 404 corresponding to the label 404.

In some embodiments, subsequent intermediate nodes may forward the packet 1 and the packet 2 according to block 1307 to block 1310, until the packet 1 and the packet 2 are forwarded to the destination node. The destination node sends the packet 1 and the packet 2 out of the network device by using a network-side port of the destination node. For example, after the packet 1 and the packet 2 reach the node 404, the label 404 corresponding to the node 404 is separately removed from the label stacks in the packet headers of the packet 1 and the packet 2. The node 404 sends the packet 1 and the packet 2 to the destination node 401 based on the indication information in the current label stacks in the packet 1 and the packet 2.

In this way, the load sharing is performed once on the source node. Traffic received by the source node may be distributed to each path based on a preset traffic distribution ratio, thereby improving efficiency of the load sharing. In addition, for either the ring network structure or the stereoscopic network structure provided in this embodiment of this application, the preset traffic distribution ratio is obtained through calculation based on a bandwidth of each path and a principle of an equivalent resistance method. In comparison with the load sharing performed based on a shortest path first algorithm, the load sharing performed in this embodiment can implement a relatively optimal load balancing effect and have a relatively low requirement for a design of a bandwidth between nodes in the network device.

Figure 15:
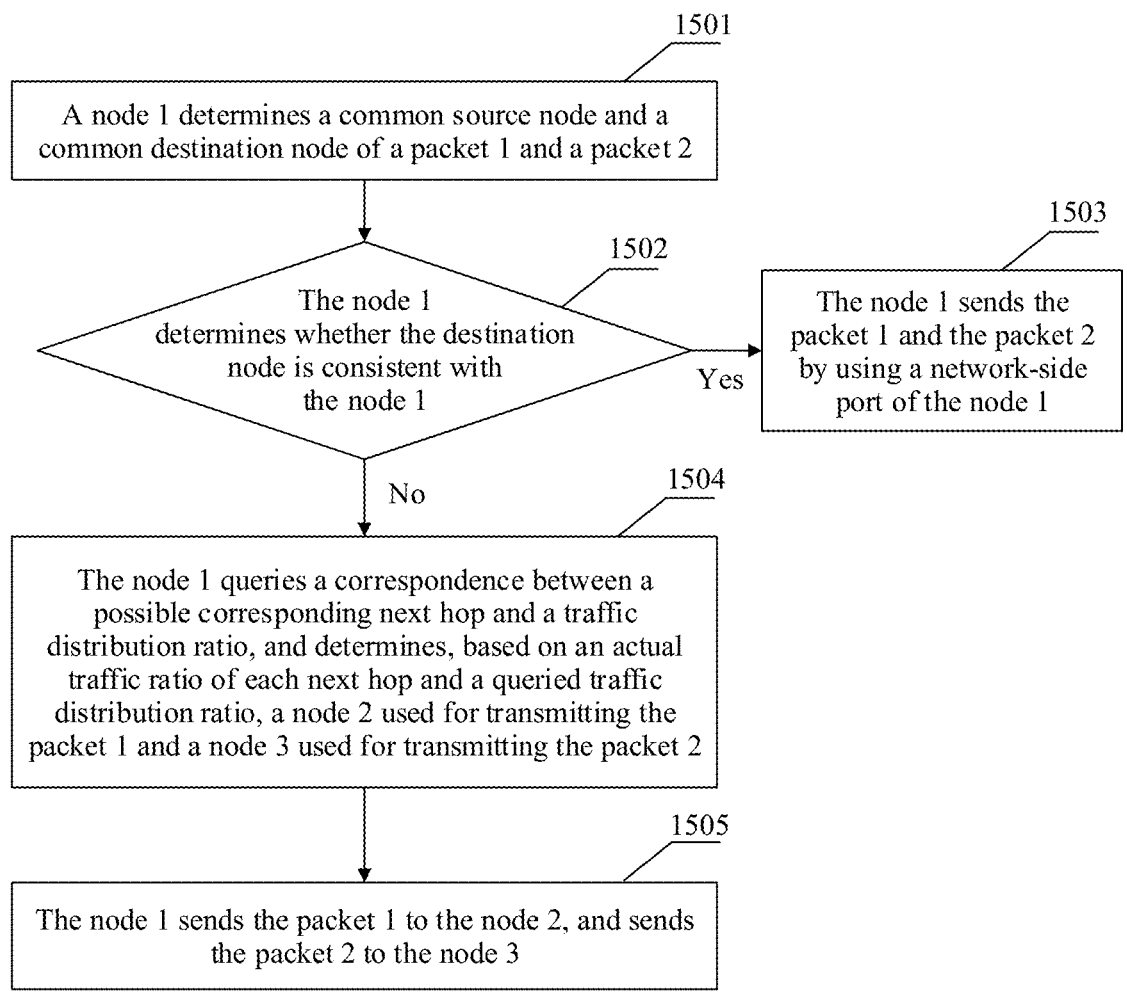
FIG. 15 is a schematic flowchart of still another implementation of a load sharing method according to an embodiment of this application.

For the load sharing manner shown in FIG. 12, in some other specific implementations, if the path 1 and the path 2 indicate next hop nodes of the node 1 from the source node to the destination node, no matter whether the node 1 is the source node, the intermediate node, or the destination node, a specific process of the load sharing method may specifically include the following blocks with reference to FIG. 15.

Block 1501: A node 1 determines a common source node and a common destination node of a packet 1 and a packet 2.

Block 1502: The node 1 determines whether the destination node is consistent with the node 1. If the destination node is consistent with the node 1, perform block 1503; or if the destination node is not consistent with the node 1, perform block 1504.

Block 1503: The node 1 sends the packet 1 and the packet 2 by using a network-side port of the node 1.

Block 1504: The node 1 queries a correspondence between a possible corresponding next hop and a traffic distribution ratio, and determines, based on an actual traffic ratio of each next hop and a queried traffic distribution ratio, a node 2 used for transmitting the packet 1 and a node 3 used for transmitting the packet 2.

In some embodiments, each node stores a correspondence between a traffic distribution ratio and a possible next hop node of the node in various possible combinations of the source node and the destination node, so that each node can effectively perform load balancing in the load sharing manner in the embodiment shown in FIG. 15.

For example, the network device 400 is used as an example. It is assumed that the source node of the packet 1 and the packet 2 is the node 402, and the destination node of the packet 1 and the packet 2 is the node 401. The node 402 stores at least Table 6 or information including the same content as Table 6. In an example, on four possible next hops from the source node 402 to the destination node 401 in the network device 400, it is assumed that currently 10 packets, 5 packets, and 5 packets are respectively forwarded by using the first three next hops (in the sequence shown in Table 6) based on the traffic distribution ratios corresponding to the first three next hops. Herein, 20 packets in total are forwarded. In this example, after receiving the packet 1 and the packet 2, the node 402 determines that both the packet 1 and the packet 2 may be forwarded to the destination node 401 by using the fourth next hop (that is, the node 406) based on actual traffic ratios of four possible next hops (that is, 10:5:5:0) and the corresponding traffic distribution ratios in Table 6 (that is, 10:5:5:4). In another example, it is assumed that currently 10 packets, 5 packets, 4 packets, and 3 packets are respectively forwarded by using each next hop based on the traffic distribution ratios corresponding to four next hops (in the sequence shown in Table 6). Herein, 22 packets in total are forwarded. In this case, after receiving the packet 1 and the packet 2, the node 402 determines that both the packet 1 and the packet 2 may be forwarded to the destination node 401 respectively by using a third next hop (that is, the node 405) and a fourth next hop (that is, the node 406) based on actual traffic ratios of four possible next hops (that is, 10:5:4:3) and the corresponding traffic distribution ratios in Table 6 (that is, 10:5:5:4). In still another case, it is assumed that currently 10 packets, 5 packets, 3 packets, and 2 packets are respectively forwarded by using each next hop based on the traffic distribution ratios corresponding to four next hops (in the sequence shown in Table 6). Herein, 20 packets in total are forwarded. In this example, after receiving the packet 1 and the packet 2, the node 402 may determine that both the packet 1 and the packet 2 are forwarded to the destination node 401 respectively by using the third next hop (that is, the node 405) and the fourth next hop (that is, the node 406) based on actual traffic ratios of four possible next hops (that is, 10:5:4:3) and the corresponding traffic distribution ratios in Table 6 (that is, 10:5:5:4); or may determine that both the packet 1 and the packet 2 are forwarded to the destination node 401 by using the third next hop (that is, the node 405); or may determine that both the packet 1 and the packet 2 are forwarded to the destination node 401 by using the fourth next hop (that is, the node 406).

Block 1505: The node 1 sends the packet 1 to the node 2, and sends the packet 2 to the node 3.

In some embodiments, a packet enters the network device. Each node through which the packet passes from the source node may perform block 1501 to block 1505 until the packet is forwarded to the destination node.

For example, the network device 400 is used as an example. It is assumed that the source node of the packet 1 is the node 402, and the destination node of the packet 1 is the node 401. The node 402 stores at least Table 6. There are four possible next hops of the source node 402 from the source node 402 to the destination node 401 of the network device 400. The four next hops are respectively the node 401, the node 403, the node 405, and the node 406.

In an example, it is assumed that the source node 402 determines, based on a traffic distribution ratio, that a next hop for the packet 1 is the node 401. In this example, the source node 402 sends the packet 1 to the node 401, and the node 401 determines that the node 401 is the destination node, so that the packet 1 can be forwarded from a network-side port.

In another example, it is assumed that the source node 402 determines, based on a traffic distribution ratio, that a next hop for the packet 1 is the node 403. In this case, the source node 402 sends the packet 1 to the node 403. The node 403 stores the following Table 9. Based on Table 9, the node 403 has two possible next hop nodes that are respectively the node 401 and the node 404. The node 403 determines, based on a traffic distribution ratio, that a next hop for the packet 1 is the node 401. In this case, the node 403 sends the packet 1 to the node 401, and the node 401 determines that the node 401 is the destination node, so that the packet 1 can be forwarded from a network-side port. Alternatively, the node 403 determines, based on a traffic distribution ratio, that a next hop for the packet 1 is the node 404, and then the node 403 sends the packet 1 to the node 404. The node 404 stores the following Table 10. Based on Table 10, the node 404 has only the next hop node: the node 401, the node 404 sends the packet 1 to the node 401, and the node 401 determines that the node 401 is the destination node, so that the packet 1 can be forwarded from a network-side port.

TABLE 9

The correspondence table that is between the path option: the node 402->the node 401 and the traffic distribution ratio and that is stored in the node 403

| (Numbers of a source node and a destination node) | Next hop node | Traffic distribution ratio |
|---|---|---|
| (402, 401) | 401 | 5/6 |
|  | 404 | 1/6 |

TABLE 10

The correspondence table that is between the path option: the node 402->the node 401 and the traffic distribution ratio and that is stored in the node 404

| (Numbers of a source node and a destination node) | Next hop node | Traffic distribution ratio |
|---|---|---|
| (402, 401) | 401 | 1 |

In still another example, it is assumed that the source node 402 determines, based on a traffic distribution ratio, that a next hop for the packet 1 is the node 405. In this case, the source node 402 sends the packet 1 to the node 405. The node 405 stores the following Table 11. Based on Table 11, the node 405 has two possible next hop nodes that are respectively the node 401 and the node 404. The node 405 determines, based on a traffic distribution ratio, that a next hop for the packet 1 is the node 401. In this case, the node 405 sends the packet 1 to the node 401, and the node 401 determines that the node 401 is the destination node, so that the packet 1 can be forwarded from a network-side port. Alternatively, the node 405 determines, based on a traffic distribution ratio, that a next hop for the packet 1 is the node 404, and then the node 405 sends the packet 1 to the node 404. The node 404 stores Table 10. Based on Table 10, the node 404 has only a next hop node: the node 401, the node 404 sends the packet 1 to the node 401, and the node 401 determines that the node 401 is the destination node, so that the packet 1 can be forwarded from a network-side port.

TABLE 11

The correspondence table that is between the path option: the node 402->the node 401 and the traffic distribution ratio and that is stored in the node 405

| (Numbers of a source node and a destination node) | Next hop node | Traffic distribution ratio |
|---|---|---|
| (402, 401) | 401 | 5/6 |
|  | 404 | 1/6 |

In yet another example, it is assumed that the source node 402 determines, based on a traffic distribution ratio, that a next hop for the packet 1 is the node 406. In this case, the source node 402 sends the packet 1 to the node 406. The node 406 stores the following Table 12. Based on Table 12, the node 406 has three possible next hop nodes that are respectively the node 403, the node 404, and the node 405. The node 406 determines, based on a traffic distribution ratio, that a next hop for the packet 1 is the node 403. In this case, the node 406 sends the packet 1 to the node 403. Based on Table 9 stored in the node 403, the node 403 determines that there are two possible next hop nodes that are respectively the node 401 and the node 404. The node 403 determines, based on a traffic distribution ratio, that a next hop for the packet 1 is the node 401. In this case, the node 403 sends the packet 1 to the node 401, and the node 401 determines that the node 401 is the destination node, so that the packet 1 can be forwarded from a network-side port. Alternatively, the node 403 determines, based on a traffic distribution ratio, that a next hop for the packet 1 is the node 404. In this case, the node 403 sends the packet 1 to the node 404. Based on Table 10 stored in the node 404, the node 404 determines that the node 404 has only a next hop node: the node 401. The node 404 sends the packet 1 to the node 401, and the node 401 determines that the node 401 is the destination node, so that the packet 1 can be forwarded from a network-side port. Likewise, if the node 406 determines, based on a traffic distribution ratio, that a next hop for the packet 1 is the node 404, the node 406 sends the packet 1 to the node 404. Based on Table 10 stored in the node 404, the node 404 determines that the node 404 has only a next hop: the node 401. The node 404 sends the packet 1 to the node 401, and the node 401 determines that the node 401 is the destination node, so that the packet 1 can be forwarded from a network-side port. If the source node 406 determines, based on a traffic distribution ratio, that a next hop for the packet 1 is the node 405, the node 406 sends the packet 1 to the node 405. Based on Table 11 stored in the node 405, the node 405 determines that the node 405 has two possible next hop nodes that are respectively the node 401 and the node 404. The node 405 determines, based on a traffic distribution ratio, that a next hop for the packet 1 is the node 401. In this case, the node 405 sends the packet 1 to the node 401, and the node 401 determines that the node 401 is the destination node, so that the packet 1 can be forwarded from a network-side port. Alternatively, the node 405 determines, based on a traffic distribution ratio, that a next hop for the packet 1 is the node 404, and then the node 403 sends the packet 1 to the node 404. Based on Table 10 stored in the node 404, the node 404 determines that the node 404 has only a next hop node: the node 401. The node 404 sends the packet 1 to the node 401, and the node 401 determines that the node 401 is the destination node, so that the packet 1 can be forwarded from a network-side port.

TABLE 12

The correspondence table that is between the path option: the node 402->the node 401 and the traffic distribution ratio and that is stored in the node 406

| (Numbers of a source node and a destination node) | Next hop node | Traffic distribution ratio |
|---|---|---|
| (402, 401) | 403 | 1/4 |
|  | 404 | 1/2 |
|  | 405 | 1/4 |

In some embodiments, the source 402 to the destination node 401 in the network device 400 shown in FIG. 4 are used as an example for description in this embodiment of this application. The source node and the destination node are directly adjacent to each other in a node pair. However, when the source node and the destination node are not directly connected to each other in a node pair, for example, the source node may be the node 406, and the destination node may be the node 401. For a load sharing method, refer to any implementation provided in the embodiments of this application.

For example, the source node is the node 406, and the destination node is the node 401. A correspondence table that is between a next hop node and a traffic distribution ratio and that is stored in the node 406 is shown in the following Table 13. There are four possible next hop nodes: the node 402, the node 403, the node 404, and the node 405. Traffic distribution ratios corresponding to the next hop nodes are consistent and are all 1/4. If the node 406 sends a packet to the node 402, a correspondence table that is between a next hop node and a traffic distribution ratio and that is stored in the node 402 is shown in the following Table 14. There is only one possible next hop node: the node 401. In other words, the node 402 sends the packet to the destination node 401. If the node 406 sends the packet to the node 403, a correspondence table that is between a next hop node and a traffic distribution ratio and that is stored in the node 403 is shown in the following Table 15. There is only one possible next hop node: the node 401. In other words, the node 403 sends the packet to the destination node 401. If the node 406 sends the packet to the node 404, a correspondence table that is between a next hop node and a traffic distribution ratio and that is stored in the node 404 is shown in the following Table 16. There is only one possible next hop node: the node 401. In other words, the node 404 sends the packet to the destination node 401. If the node 406 sends the packet to the node 405, a correspondence table that is between a next hop node and a traffic distribution ratio and that is stored in the node 405 is shown in the following Table 17. There is only one possible next hop node: the node 401. In other words, the node 405 sends the packet to the destination node 401.

TABLE 13

The correspondence table that is between the path option: the node 406->the node 401 and the traffic distribution ratio and that is stored in the node 406

| (Numbers of a source node and a destination node) | Next hop node | Traffic distribution ratio |
|---|---|---|
| (406, 401) | 402 | 1/4 |
|  | 403 | 1/4 |
|  | 404 | 1/4 |
|  | 405 | 1/4 |

TABLE 14

The correspondence table that is between the path option: the node 406->the node 401 and the traffic distribution ratio and that is stored in the node 402

| (Numbers of a source node and a destination node) | Next hop node | Traffic distribution ratio |
|---|---|---|
| (406, 401) | 401 | 1 |

TABLE 15

The correspondence table that is between the path option: the node 406->the node 401 and the traffic distribution ratio and that is stored in the node 403

| (Numbers of a source node and a destination node) | Next hop node | Traffic distribution ratio |
|---|---|---|
| (406, 401) | 401 | 1 |

TABLE 16

The correspondence table that is between the path option: the node 406->the node 401 and the traffic distribution ratio and that is stored in the node 404

| (Numbers of a source node and a destination node) | Next hop node | Traffic distribution ratio |
|---|---|---|
| (406, 401) | 401 | 1 |

TABLE 17

The correspondence table that is between the path option: the node 406->the node 401 and the traffic distribution ratio and that is stored in the node 405

| (Numbers of a source node and a destination node) | Next hop node | Traffic distribution ratio |
|---|---|---|
| (406, 401) | 401 | 1 |

In this way, the load sharing is successively performed on each node. Traffic received by each node is distributed to each next hop based on a preset traffic distribution ratio, to further refine the load sharing process. In addition, for either the ring network structure or the stereoscopic network structure provided in this embodiment of this application, the preset traffic distribution ratio is obtained through calculation based on a bandwidth of each path and a principle of an equivalent resistance method. In comparison with the load sharing performed based on a shortest path first algorithm, the load sharing performed in this embodiment can implement a relatively optimal load balancing effect and have a relatively low requirement for a design of a bandwidth between nodes in the network device.

In some embodiments, a specific implementation of applying the equivalent resistance method to the load sharing on the nodes in the network device may include: The source node correspondingly performs load sharing once by using block 1301 to block 1310, and strictly specifies an implementation of a subsequent traffic forwarding path. Various hop nodes correspondingly perform load sharing for a plurality of times on traffic hop by hop by using block 1501 to block 1505. Each hop node participates in a traffic distribution implementation. This embodiment of this application may further be implemented in the following manner: Some nodes designate a strict forwarding path. Each of other nodes other than the strict forwarding path participates in the traffic distribution implementation. In this implementation, for a specific implementation of the node performing forwarding on the strict forwarding path, refer to corresponding descriptions of block 1301 to block 1310. For a specific implementation of each hop node participating in traffic distribution, refer to corresponding descriptions of block 1501 to block 1505. Details are not described again.

After the embodiments of this application are described, the following quantizes an effect of balancing a switching capability of the network device and a link bandwidth through calculating a fabric speedup based on the network device with the stereoscopic network structure and the load sharing method applicable to the stereoscopic network structure and the ring network structure.

In some embodiments, for a fabric speedup of each node in the network device, fabric speedups of the nodes in, for example, the strictly symmetrical network devices shown in FIG. 3a, and FIG. 4 to FIG. 8 are equal. When a node meets a non-blocking switching condition, the fabric speedup of each node is equal to a ratio between a maximum value of a sum of link bandwidths between the node and an adjacent node, and a network-side bandwidth of the node. A smaller fabric speedup indicates that a relatively small link bandwidth is designed for the network device to implement non-blocking switching of a plurality of nodes.

In some embodiments, when the load sharing is performed by using the shortest path first algorithm and the equivalent resistance method, as shown in the following Table 18, minimum fabric speedups that need to be designed for strictly symmetrical network devices with various network structures to meet the non-blocking switching may be calculated.

TABLE 18

Fabric speedups required for the non-blocking switching of the network device in different load sharing methods

| | Load sharing method | 4 nodes | 6 nodes | 8 nodes |
|---|---|---|---|---|
| Ring network | Shortest path first algorithm | 2.0 | 4.0 | 6.0 |
| | Equivalent resistance method | 2.0 | 3.0 | 4.0 |
| Stereoscopic network | Shortest path first algorithm | 3.0 | 4.0 | 4.0 |
| | Equivalent resistance method | 1.5 | 2.0 | 3.0 |

It may be learned from Table 18 that, for the network device with the stereoscopic network structure provided in this embodiment of this application, a fabric speedup of the network device with the stereoscopic network structure is basically less than that of the network device with the ring network structure including the same quantity of nodes regardless of whether the load sharing is performed by using the shortest path first algorithm or the equivalent resistance method. This advantage gradually increases as a quantity of nodes increases. In cases of four nodes and six nodes, a fabric speedup of the network device with the stereoscopic network structure is almost equal to that of the network device with ring network structure. However, because optional paths between the nodes in the network device with the stereoscopic network structure increases, a delay of transmitting a packet in the network device with the stereoscopic network structure may be relatively low, thereby improving switching efficiency of the network device. In other words, when the network device with the stereoscopic network structure provided in this embodiment of this application is used, to meet non-blocking switching in cases of the same quantity of nodes, a relatively small link bandwidth may be set when the network device is designed. In this way, when a relatively high requirement is imposed on a switching capability, a relatively small link bandwidth may be set to ensure the non-blocking switching even if a quantity of nodes in the network device greatly increases.

In the method of calculating the traffic distribution ratio based on the equivalent resistance method provided in this embodiment of this application and performing load sharing in the network device based on the preset traffic distribution ratio, for either the network device with the stereoscopic network structure or the network device with the ring network structure, the fabric speedup in the load sharing method provided in this embodiment of this application is less than the fabric speedup in the load sharing performed by using the shortest path first algorithm. In other words, when the load sharing method provided in this embodiment of this application is used, a relatively small link bandwidth may be set when the network device is designed, to meet non-blocking switching in cases of the same quantity of nodes. In this way, when the relatively high requirement is imposed on the switching capability, there is not excessively large pressure on a design of the link bandwidth even if the quantity of nodes in the network device greatly increases.

This embodiment of this application provides the network device with the stereoscopic network structure including the plurality of nodes. In comparison with the ring network structure including the same quantity of nodes, in the stereoscopic network structure, a node is connected to more adjacent nodes, that is, a quantity of path options from each node to another node increases. The switching capability and the link bandwidth may be properly balanced when the network device is designed. In addition, this embodiment of this application further provides the load sharing method for the network device. Circuit knowledge such as the Kirchhoff voltage law and the Kirchhoff current law is applied to the load sharing implemented between the nodes in various network devices mentioned in the embodiments of this application. By using the equivalent resistance method, a traffic distribution ratio is correspondingly calculated for each possible path, and the traffic distribution ratio and the corresponding path are preset for a corresponding node, to ensure that traffic forwarded on each path in the network device meets a preset traffic distribution ratio. In this way, in comparison with the load sharing performed in the network device by using the shortest path first algorithm, the load sharing performed in the network device by using the equivalent resistance method may implement distributing traffic to each path based on the preset ratio without causing excessively large bandwidth pressure on a shortest path, to implement relatively optimal load balancing. The requirement for the link bandwidth between the nodes in either the network device with the ring network structure or the network device with the stereoscopic network structure can be reduced. In other words, a relatively small link bandwidth may be designed to implement the non-blocking switching, to implement a proper balance between the switching capability and the design of the link bandwidth.

To more clearly describe the load sharing in the network device mentioned in this embodiment of this application, the following uses an implementation corresponding to block 1301 to block 1310 as an example to describe a correspondence that is between a path option and a traffic distribution ratio and that is stored in some nodes in network devices with several network structures.

For example, the node 302 in the network device 300 is used as an example. For a correspondence that is between a path option and a traffic distribution ratio and that is stored in the node 302, refer to the following Table 19.

TABLE 19

The correspondence table that is between the path option and the traffic distribution ratio and that is stored in the node 302

| Number of a destination node | Path option | Traffic distribution ratio |
| --- | --- | --- |
| 301 | 302->301 | 1/2 |
|  | 302->303->301 | 1/4 |
|  | 302->304->301 | 1/4 |
| 303 | 302->303 | 1/2 |
|  | 302->301->303 | 1/4 |
|  | 302->304->303 | 1/4 |
| 304 | 302->304 | 1/2 |
|  | 302->301->304 | 1/4 |
|  | 302->303->304 | 1/4 |

For another example, the node 402 in the network device 400 is used as an example. For a correspondence that is between a path option and a traffic distribution ratio and that is stored in the node 402, refer to the following Table 20.

TABLE 20

The correspondence table that is between the path option and the traffic distribution ratio and that is stored in the node 402

| Number of a destination node | Path option | Traffic distribution ratio |
| --- | --- | --- |
| 401 | 402->401 | 10/24 |
|  | 402->403->401 | 5/24 |
|  | 402->405->401 | 5/24 |
|  | 402->406->403->404->401 | 1/24 |
|  | 402->406->405->404->401 | 1/24 |
|  | 402->406->404->401 | 2/24 |
| 403 | 402->403 | 10/24 |
|  | 402->401->403 | 5/24 |
|  | 402->406->403 | 5/24 |
|  | 402->405->401->404->403 | 1/24 |
|  | 402->405->406->404->403 | 1/24 |
|  | 402->405->404->403 | 2/24 |
| 404 | 402->401->404 | 1/4 |
|  | 402->403->404 | 1/4 |
|  | 402->406->404 | 1/4 |
|  | 402->405->404 | 1/4 |
| 405 | 402->405 | 10/24 |
|  | 402->401->405 | 5/24 |
|  | 402->406->405 | 5/24 |
|  | 402->403->401->404->405 | 1/24 |
|  | 402->403->406->404->405 | 1/24 |
|  | 402->403->404->405 | 2/24 |
| 406 | 402->406 | 10/24 |
|  | 402->403->406 | 5/24 |
|  | 402->405->406 | 5/24 |
|  | 402->401->403->404->406 | 1/24 |
|  | 402->401->405->404->406 | 1/24 |
|  | 402->401->404->406 | 2/24 |

For a correspondence that is between a next hop node and a traffic distribution ratio and that is stored in the node 402, refer to the following Table 21. In this way, load sharing may be performed in an implementation corresponding to block 1501 to block 1505.

TABLE 21

The correspondence table that is between the next hop node and the traffic distribution ratio and that is stored in the node 402

| (Numbers of a source node and a destination node) | Next hop node | Traffic distribution ratio |
| --- | --- | --- |
| (2, 1) | 1 | 10/24 |
|  | 3 | 5/24 |
|  | 5 | 5/24 |
|  | 6 | 4/24 |
| (3, 1) | 1 | 5/6 |
|  | 5 | 1/6 |
| (4, 1) | 1 | 1/1 |
| (5, 1) | 1 | 5/6 |
|  | 3 | 1/6 |
| (6, 1) | 1 | 1/1 |
| ... | ... | ... |

For still another example, the node 502 in the network device 500 is used as an example. For a correspondence that is between a path option and a traffic distribution ratio and that is stored in the node 502, refer to the following Table 22.

TABLE 22

The correspondence table that is between the path option and the traffic distribution ratio and that is stored in the node 502

| Number of a destination node | Path option | Traffic distribution ratio |
| --- | --- | --- |
| 501 | 502->501 | 8/15 |
|  | 502->503->501 | 4/15 |
|  | 502->505->504->501 | 2/15 |
|  | 502->505->506->504->501 | 1/15 |
| 503 | 502->503 | 8/15 |
|  | 502->501->503 | 4/15 |
|  | 502->505->506->503 | 2/15 |
|  | 502->505->504->506->503 | 1/15 |
| 504 | 502->501->504 | 5/15 |
|  | 502->503->501->504 | 1/15 |
|  | 502->503->506->504 | 3/15 |
|  | 502->505->504 | 5/15 |
|  | 502->505->506->504 | 1/15 |
| 505 | 502->505 | 3/5 |
|  | 502->501->504->505 | 1/5 |
|  | 502->503->506->505 | 1/5 |
| 506 | 502->503->506 | 5/15 |
|  | 502->501->503->506 | 1/15 |
|  | 502->501->504->506 | 3/15 |
|  | 502->505->506 | 5/15 |
|  | 502->505->504->506 | 1/15 |

For yet another example, the node 702 in the network device 700 is used as an example. For a correspondence that is between a path option and a traffic distribution ratio and that is stored in the node 702, refer to the following Table 23.

TABLE 23

The correspondence table that is between the path option and the
traffic distribution ratio and that is stored in the node 702

| Number of a destination node | Path option | Traffic distribution ratio |
|---|---|---|
| 701 | 702–>701 | 14/24 |
|  | 702–>703–>704–>701 | 4/24 |
|  | 702–>706–>705–>701 | 4/24 |
|  | 702–>703–>707–>708–>704–>701 | 1/24 |
|  | 702–>706–>707–>708–>705–>701 | 1/24 |
| 703 | 702–>703 | 14/24 |
|  | 702–>701–>704–>703 | 4/24 |
|  | 702–>706–>707–>703 | 4/24 |
|  | 702–>701–>705–>708–>704–>703 | 1/24 |
|  | 702–>706–>705–>708–>707–>703 | 1/24 |
| 704 | 702–>701–>704 | 3/8 |
|  | 702–>703–>704 | 3/8 |
|  | 702–>706–>705–>708–>704 | 1/8 |
|  | 702–>706–>707–>708–>704 | 1/8 |
| 705 | 702–>701–>705 | 3/8 |
|  | 702–>706–>705 | 3/8 |
|  | 702–>703–>704–>708–>705 | 1/8 |
|  | 702–>703–>707–>708–>705 | 1/8 |
| 706 | 702–>706 | 14/24 |
|  | 702–>703–>707–>706 | 4/24 |
|  | 702–>701–>705–>706 | 4/24 |
|  | 702–>703–>704–>708–>707–>706 | 1/24 |
|  | 702–>701–>704–>708–>705–>706 | 1/24 |
| 707 | 702–>703–>707 | 3/8 |
|  | 702–>706–>707 | 3/8 |
|  | 702–>701–>704–>708–>707 | 1/8 |
|  | 702–>701–>705–>708–>707 | 1/8 |
| 708 | 702–>701–>704–>708 | 1/6 |
|  | 702–>701–>705–>708 | 1/6 |
|  | 702–>703–>704–>708 | 1/6 |
|  | 702–>703–>707–>708 | 1/6 |
|  | 702–>706–>705–>708 | 1/6 |
|  | 702–>706–>707–>708 | 1/6 |

For yet another example, the node 252 in the network device 250 with the ring network structure is used as an example. For a correspondence that is between a path option and a traffic distribution ratio and that is stored in the node 252, refer to the following Table 24.

TABLE 24

The correspondence table that is between the path option and the
traffic distribution ratio and that is stored in the node 252

| Number of a destination node | Path option | Traffic distribution ratio |
|---|---|---|
| 251 | 252–>251 | 7/8 |
|  | 252–>253–>254–>255–>256–>257–>258–>251 | 1/8 |
| 253 | 252–>253 | 7/8 |
|  | 252–>251–>258–>257–>256–>255–>254–>253 | 1/8 |
| 254 | 252–>253–>254 | 6/8 |
|  | 252–>251–>258–>257–>256–>255–>254 | 2/8 |
| 255 | 252–>253–>254–>255 | 5/8 |
|  | 252–>251–>258–>257–>256–>255 | 3/8 |
| 256 | 252–>253–>254–>255–>256 | 4/8 |
|  | 252–>251–>258–>257–>256 | 4/8 |
| 257 | 225–>251–>258–>257 | 5/8 |
|  | 252–>253–>254–>255–>256–>257 | 3/8 |
| 258 | 252–>251–>258 | 6/8 |
|  | 252–>253–>254–>255–>256–>257–>258 | 2/8 |

Figure 16:
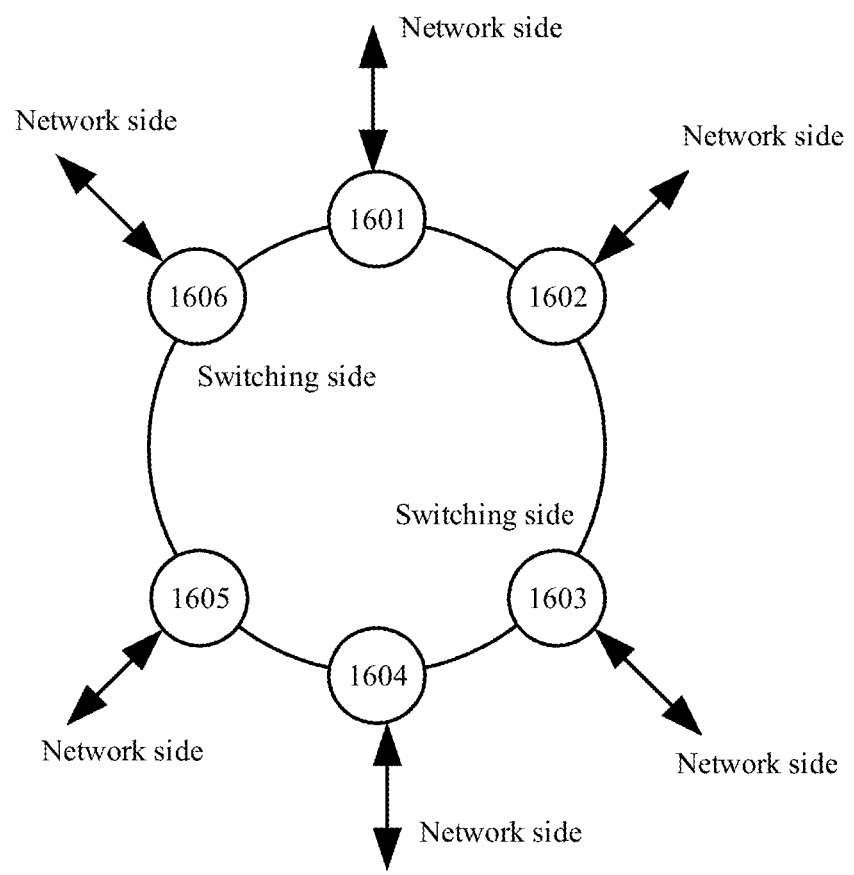
FIG. 16 is a schematic diagram of a structure of a network device 1600 with a ring network structure including six nodes according to an embodiment of this application.

For yet another example, a node 1602 in a network device 1600 with a ring network structure including six nodes shown in FIG. 16 is used as an example. For a correspondence that is between a path option and a traffic distribution ratio and that is stored in the node 1602, refer to the following Table 25.

TABLE 25

The correspondence table that is between the path option and the traffic distribution ratio and that is stored in the node 1602

| Number of a destination node | Path option | Traffic distribution ratio |
|---|---|---|
| 1601 | 1602->1601 | 5/6 |
|  | 1602->1603->1604->1605->1606->1601 | 1/6 |
| 1603 | 1602->1603 | 5/6 |
|  | 1602->1601->1606->1605->1604->1603 | 1/6 |
| 1604 | 1602->1603->1604 | 4/6 |
|  | 1602->1601->1606->1605->1604 | 2/6 |
| 1605 | 1602->1603->1604->1605 | 3/6 |
|  | 1602->1601->1606->1605 | 3/6 |
| 1606 | 1602->1601->1606 | 4/6 |
|  | 1602->1603->1604->1605->1606 | 2/6 |

Figure 17:
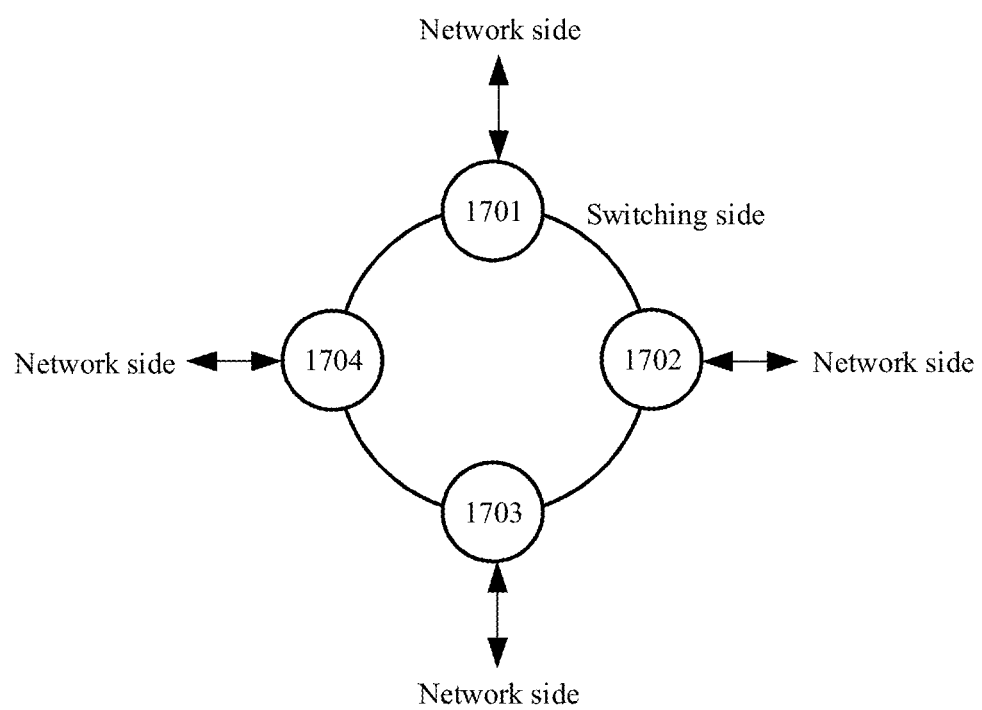
FIG. 17 is a schematic diagram of a structure of a network device 1700 with a ring network structure including four nodes according to an embodiment of this application.

For yet another example, a node 1702 in a network device 1700 with a ring network structure including four nodes shown in FIG. 17 is used as an example. For a correspondence that is between a path option and a traffic distribution ratio and that is stored in the node 1702, refer to the following Table 26.

TABLE 26

The correspondence table that is between the path option and the traffic distribution ratio and that is stored in the node 1702

| Number of a destination node | Path option | Traffic distribution ratio |
|---|---|---|
| 1701 | 1702->1701 | 3/4 |
|  | 1702->1703->1704->1701 | 1/4 |
| 1703 | 1702->1703 | 3/4 |
|  | 1702->1701->1704->1703 | 1/4 |
| 1704 | 1702->1703->1704 | 1/2 |
|  | 1702->1701->1704 | 1/2 |

It may be learned that circuit knowledge such as the Kirchhoff voltage law and the Kirchhoff current law is applied to the load sharing method on nodes in various network devices to calculate corresponding traffic distribution ratios for various possible paths. A correspondence table that is between a path option and a traffic distribution ratio and that is shown in the foregoing examples is preset for each node in the network device. In this way, a corresponding path is selected based on the preset traffic distribution ratio for the traffic reaching the network device without causing excessive bandwidth pressure on a shortest path, to implement optimal load balancing. A requirement for a link bandwidth between the nodes in either the network device with the ring network structure or the network device with the stereoscopic network structure. In other words, a relatively small link bandwidth may be designed to implement non-blocking switching, to implement a proper balance between the switching capability and the design of the link bandwidth.

Figure 18:
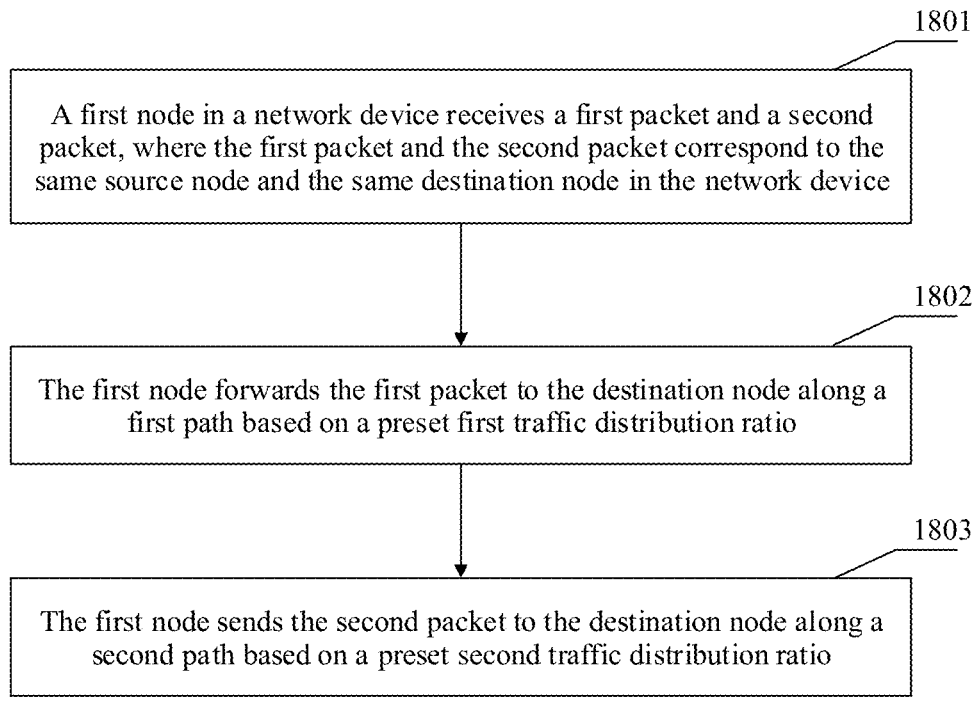
FIG. 18 is a schematic flowchart of a load sharing method according to an embodiment of this application.
Figure 19:
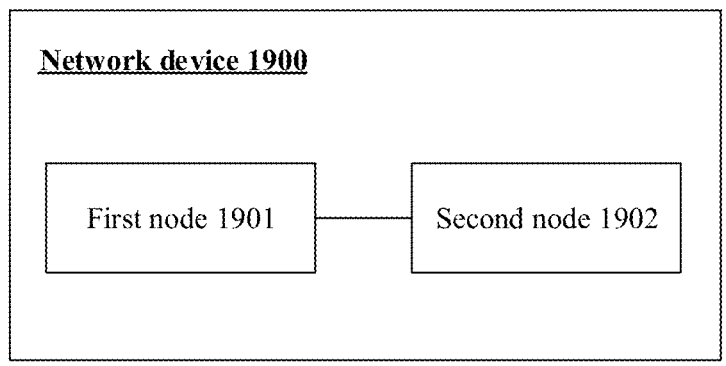
FIG. 19 is a schematic diagram of a structure of a network device according to an embodiment of this application.

FIG. 18 is a schematic flowchart of a load sharing method according to an embodiment of this application. The method is performed by a first node in a network device. The method may specifically include the following blocks:

Block 1801: The first node in the network device receives a first packet and a second packet, where the first packet and the second packet correspond to the same source node and the same destination node in the network device.

Block 1802: The first node forwards the first packet to the destination node along a first path based on a preset first traffic distribution ratio.

Block 1803: The first node sends the second packet to the destination node along a second path based on a preset second traffic distribution ratio.

In some embodiments, the load sharing method may be applied to a network device that includes at least four nodes forming a stereoscopic network structure. The stereoscopic network structure indicates that at least one node in the network device is directly connected to more than two nodes. In another case, the load sharing method may also be applied to a network device that includes at least three nodes forming a ring network structure. The ring network structure indicates that each node in the network device is directly connected to two nodes. If the source node and the destination node are two fully symmetrical nodes in the ring network structure, the first traffic distribution ratio is equal to the second traffic distribution ratio. If the source node and the destination node are two asymmetrical nodes in the ring network structure, the first traffic distribution ratio is not equal to the second traffic distribution ratio.

The first traffic distribution ratio and the second traffic distribution ratio are determined based on a load sharing algorithm provided in this embodiment of this application: an equivalent resistance method.

In some embodiments, there is no sequence of performing block 1802 and block 1803. Block 1802 may be performed before block 1803, or block 1803 may be performed before block 1802, or block 1802 and block 1803 are performed at the same time.

The first node corresponds to the node 1 in the embodiment shown in FIG. 12. The first packet and the second packet respectively correspond to the packet 1 and the packet 2 in the embodiment shown in FIG. 12. The first traffic distribution ratio and the second traffic distribution ratio respectively correspond to the traffic distribution ratio X and the traffic distribution ratio Y in the embodiment shown in FIG. 12. The first path and the second path respectively correspond to the path 1 and the path 2 in the embodiment shown in FIG. 12.

In some embodiments, for specific descriptions and implementations of block 1801 to block 1803, refer to related descriptions of block 1201 to block 1203 in the embodiment corresponding to FIG. 12.

In some embodiments, the first node is the source node, indication information that is of the first path and that is stored in the first node is used to indicate each hop node on the first path from the source node to the destination node, and indication information of the second path is used to indicate each hop node on the second path from the source node to the destination node. In this case, after the first node in the network device receives the first packet and the second packet, the method further includes: The first node encapsulates the indication information of the first path into the first packet. The first node encapsulates the indication information of the second path into the second packet.

In this way, after traffic to the same destination node enters the network device from the first node, load sharing is performed only once at the source node. Specifically, a path that includes each hop node and that is determined based on a traffic distribution ratio is separately encapsulated into a corresponding packet, and the encapsulated packet is separately forwarded based on encapsulated indication information of the path including each hop node.

For specific implementation and related descriptions of this implementation, refer to related descriptions in the embodiments corresponding to FIG. 13 and FIG. 14.

In another specific implementation, regardless of whether the first node is the source node or an intermediate node, indication information that is of the first path and that is stored in the first node is used to indicate a first next hop node of the first node on the first path from the source node to the destination node, and indication information that is of the second path and that is stored in the first node is used to indicate a second next hop node of the first node on the second path from the source node to the destination node. In this case, block 1802 may include: The first node sends the first packet to the first next hop node based on the indication information of the first path. Block 1803 may include: The first node sends the second packet to the second next hop node based on the indication information of the second path.

In this way, after the traffic to the same destination node enters the network device from the first node, the load sharing is performed on the source node and each hop intermediate node. To be specific, a load sharing process is performed once at each hop node of the network device based on a preset traffic distribution ratio, to determine a next hop node of the current hop node. In this way, load balancing is more flexibly implemented, and a load sharing capability of a network device is improved.

In some embodiments, for specific implementation and related descriptions of this implementation, refer to the related descriptions in the embodiment corresponding to FIG. 15.

In another implementation, indication information that is of various paths and that is stored in the first node in the network device may be the same, or may be different, or may be flexibly configured. For example, the indication information may include information used to indicate each hop node on the path from the source node to the destination node, and/or information used to indicate a next hop node of the first node on the path from the source node to the destination node. For another example, the indication information may further be information used to indicate each hop node on a path from the source node to a second node. In this case, the second node to the destination node need to store indication information of a next hop node of a current hop node on a path from the second node to the destination node. For still another example, the indication information may further be indication information that is stored in the first node to the third node and that is used to indicate a next hop node of a current hop node on a path from the first node to a third node. In this case, the third node to the destination node need to store information of each hop node on a path from the third node to the destination node.

In some embodiments, the first node may determine a granularity of the first traffic distribution ratio and the second traffic distribution ratio based on any one of the following parameters: a packet quantity or a packet length. The packet length may be a length of bytes included in a packet or a quantity of units included in a packet.

In still another specific implementation, if a plurality of nodes included in the network device in this embodiment of this application form a stereoscopic network structure, for example, the stereoscopic network structure may be specifically a tetrahedron, a hexahedron, an octahedron, or a triangular prism.

In some embodiments, the load sharing method corresponds to the load sharing method corresponding to FIG. 12. Therefore, for related descriptions of various possible implementations and effects of the load sharing method, refer to the related descriptions of the load sharing method corresponding to FIG. 12.

An embodiment of the present invention further provides a network device. The network device includes at least four nodes. The at least four nodes include a first node, a second node, a third node, and a fourth node. The first node is directly connected to the second node, the third node, and the fourth node. In addition, the first node is configured to: receive a packet, and send the packet to the second node, the third node, or the fourth node.

In a specific implementation, the at least four nodes form a stereoscopic network structure, and the stereoscopic network structure is a tetrahedron, a hexahedron, an octahedron, or a triangular prism.

In some embodiments, for details of the network device in this embodiment, refer to the network devices shown in FIG. 3*a*, and FIG. 4 to FIG. 8 and the corresponding descriptions. Details are not described herein again.

In addition, an embodiment of this application further provides a network device 1900. The network device 1900 may specifically be a switching network board in the network device. The switching network board includes a switching chip. The switching chip includes a plurality of dies, that is, nodes in the network device. The network device 1900 includes a first node 1901 and a second node 1902.

The first node 1901 is configured to receive a first packet and a second packet. The first packet and the second packet correspond to the same source node and the same destination node in the network device. The destination node is the second node 1902. The first node 1901 is further configured to forward the first packet to the destination node along a first path based on a preset first traffic distribution ratio. The first node 1901 is further configured to send the second packet to the destination node along a second path based on a preset second traffic distribution ratio.

In some embodiments, the network device 1900 may be a network device that includes at least four nodes forming a stereoscopic network structure. The stereoscopic network structure indicates that at least one node in the network device 1900 is directly connected to more than two nodes. In another case, the network device 1900 may be alternatively a network device that includes at least three nodes forming a ring network structure. The ring network structure indicates that each node in the network device 1900 is directly connected to two nodes. If the source node and the destination node are two fully symmetrical nodes in the ring network structure, the first traffic distribution ratio is equal to the second traffic distribution ratio. If the source node and the destination node are two asymmetrical nodes in the ring network structure, the first traffic distribution ratio is not equal to the second traffic distribution ratio.

In a specific implementation, if the first node 1901 is the source node, the first node 1901 is further configured to: after the first packet is received, encapsulate indication information of the first path into the first packet, where the indication information of the first path is used to indicate each hop node on the first path from the source node to the destination node. In this way, after traffic to the same destination node enters the network device from the first node 1901, load sharing is performed only once at the source node. Specifically, a path that includes each hop node and that is determined based on a traffic distribution ratio is separately encapsulated into a corresponding packet, and the encapsulated packet is separately forwarded based on encapsulated indication information of the path including each hop node.

In another specific implementation, the first node 1901 may be further specifically configured to send the second packet to a next hop node of the first node 1901 based on indication information of the second path. In this way, after the traffic to the same destination node enters the network device from the first node 1901, load sharing is performed on the source node and each hop intermediate node. To be specific, a load sharing process is performed once at each hop node of the network device based on a preset traffic distribution ratio, to determine a next hop node of the current hop node. In this way, load balancing is more flexibly implemented, and a load sharing capability of a network device is improved.

In some embodiments, the first traffic distribution ratio and the second traffic distribution ratio are determined by using an equivalent resistance method.

In some embodiments, the first node 1901 may determine a granularity of the first traffic distribution ratio and the second traffic distribution ratio based on any one of the following parameters: a packet quantity or a packet length.

In still another specific implementation, if the plurality of nodes included in the network device 1900 form a stereoscopic network structure, the stereoscopic network structure may be a tetrahedron, a hexahedron, an octahedron, or a triangular prism.

In some embodiments, the network device 1900 corresponds to the load sharing method provided in the embodiment of this application. Therefore, for various possible implementations and technical effects of the network device, refer to the foregoing descriptions of the load sharing method.

Figure 20:
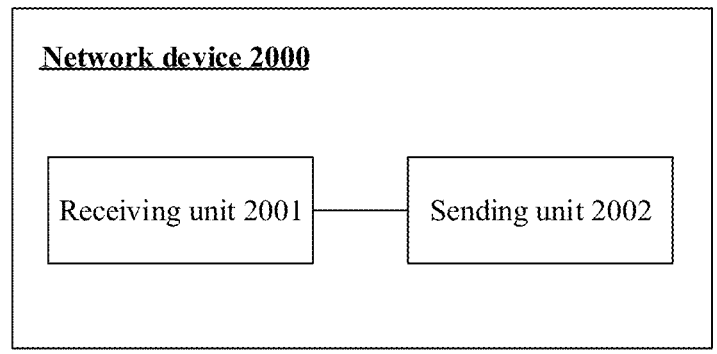
FIG. 20 is a schematic diagram of a structure of another network device according to an embodiment of this application.
Figure 21:
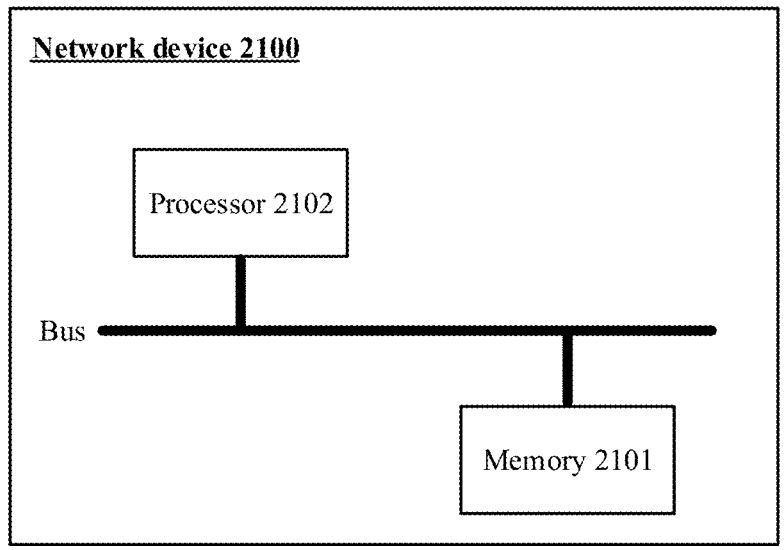
FIG. 21 is a schematic diagram of a structure of still another network device according to an embodiment of this application.

In addition, FIG. 20 is a schematic diagram of a structure of a network device 2000 according to an embodiment of this application. The network device 2000 may be specifically a switching chip. A plurality of dies included in the switching chip are nodes in the network device. The network device 2000 includes a first node including a receiving unit 2001 and a sending unit 2002.

The receiving unit 2001 is configured to receive a first packet and a second packet by using the first node. The first packet and the second packet correspond to the same source node and the same destination node in the network device. The sending unit 2002 is configured to: forward the first packet to the destination node along a first path by using the first node based on a preset first traffic distribution ratio; and send the second packet to the destination node along a second path by using the first node based on a preset second traffic distribution ratio.

In some embodiments, the network device 2000 may be a network device that includes at least four nodes forming a stereoscopic network structure. The stereoscopic network structure indicates that at least one node in the network device 2000 is directly connected to more than two nodes. In another case, the network device 2000 may be alternatively a network device that includes at least three nodes forming a ring network structure. The ring network structure indicates that each node in the network device 2000 is directly connected to two nodes. If the source node and the destination node are two fully symmetrical nodes in the ring network structure, the first traffic distribution ratio is equal to the second traffic distribution ratio. If the source node and the destination node are two asymmetrical nodes in the ring network structure, the first traffic distribution ratio is not equal to the second traffic distribution ratio.

In a specific implementation, the first node is the source node, and the network device 2000 further includes: a processing unit, configured to: after the first packet is received by using the first node, encapsulate indication information of the first path into the first packet, where the indication information of the first path is used to indicate each hop node on the first path from the source node to the destination node.

In this way, after traffic to the same destination node enters the network device from the first node, load sharing is performed only once at the source node. Specifically, a path that includes each hop node and that is determined based on a traffic distribution ratio is separately encapsulated into a corresponding packet, and the encapsulated packet is separately forwarded based on encapsulated indication information of the path including each hop node.

In another specific implementation, the sending unit 2002 is specifically configured to send the second packet to a next hop node of the first node based on indication information of the second path.

In this way, after traffic to the same destination node enters the network device from the first node, load sharing is performed on the source node and each hop intermediate node. To be specific, a load sharing process is performed once at each hop node of the network device based on a preset traffic distribution ratio, to determine a next hop node of the current hop node. In this way, load balancing is more flexibly implemented, and a load sharing capability of a network device is improved.

In some embodiments, the first traffic distribution ratio and the second traffic distribution ratio are determined by using an equivalent resistance method.

In some embodiments, the first node determines a granularity of the first traffic distribution ratio and the second traffic distribution ratio based on any one of the following parameters: a packet quantity or a packet length.

In still another specific implementation, if the network device 2000 has a stereoscopic network structure including a plurality of nodes, the stereoscopic network structure may be specifically a tetrahedron, a hexahedron, an octahedron, or a triangular prism.

In some embodiments, the network device 2000 corresponds to the load sharing method embodiments corresponding to FIG. 12 and FIG. 18. Therefore, for related descriptions of various possible implementations and effects of the network device 2000, refer to related descriptions of the load sharing methods corresponding to FIG. 12 and FIG. 18.

In addition, an embodiment of this application further provides a network device 2100. The network device 2100 includes a memory 2101 and a processor 2102. The memory 2101 is configured to store program code. The processor 2102 is configured to run instructions in the program code, so that the network device 2100 performs the load sharing method in any implementation of FIG. 12 or FIG. 18.

In this application, the network device may be a device such as a switch or a router. Alternatively, the network device may be a switching network board or a switching chip in a device such as a router or a switch. The network device may be one device, or may include a plurality of devices. For example, the network device includes a plurality of switching chips.

The processor 2102 may be a central processing unit (CPU for short), a network processor (NP for short), or a combination of a CPU and an NP. Alternatively, the processor 2102 may be an application-specific integrated circuit (ASIC for short), a programmable logic device (PLD for short), or a combination thereof. The PLD may be a complex programmable logic device (CPLD for short), a field-programmable gate array (FPGA for short), generic array logic (GAL for short), or any combination thereof. The processor 2102 may be one processor, or may include a plurality of processors. The memory 2101 may include a volatile memory, for example, a random access memory (RAM for short); or the memory 2101 may include a non-volatile memory, for example, a read-only memory (ROM for short), a flash memory, a hard disk drive (HDD for short), or a solid-state drive (SSD for short). Alternatively, the memory 2101 may include a combination of the foregoing types of memories. The memory 2101 may be one memory, or may include a plurality of memories. In a specific implementation, the memory 2101 stores computer-readable instructions, and the computer-readable instructions include a plurality of software modules, for example, a sending module, a processing module, and a receiving module. After executing each software module, the processor 2102 may perform a corresponding operation based on an indication of each software module. In this embodiment, an operation performed by a software module is actually an operation performed by the processor 2102 based on an indication of the software module. After executing the computer-readable instructions in the memory 2101, the processor 2102 may perform, based on indications of the computer-readable instructions, all operations that may be performed by the network device 2100.

In addition, an embodiment of this application further provides a computer program product. When the computer program product runs on a computer, the computer is enabled to perform the load sharing method in any one of the foregoing implementations in FIG. 12 or FIG. 18.

In addition, an embodiment of this application further provides a computer-readable storage medium. The computer-readable storage medium stores instructions. When the instructions are run on a computer, the computer is enabled to perform the load sharing method in any one of the foregoing implementations in FIG. 12 or FIG. 18.

"First" in terms such as the "first packet" and the "first path" mentioned in the embodiments of this application is merely used as a name identifier, but does not represent first in sequence. This rule is also applicable to "second" and the like.

In this application, "load sharing" and "load balancing" are frequently interchangeably used. A person skilled in the art may understand that the two terms convey the same meaning.

It can be learned from the foregoing descriptions of the implementations that, a person skilled in the art may clearly understand that a part or all of the blocks of the methods in the foregoing embodiments may be implemented by using software and a universal hardware platform. Based on such an understanding, the technical solutions of this application may be implemented in a form of a software product. The computer software product may be stored in a storage medium, for example, a read-only memory (ROM)/RAM, a magnetic disk, or an optical disc, and include several instructions for instructing a computer device (which may be a personal computer, a server, or a network communications device such as a router) to perform the methods described in the embodiments or some parts of the embodiments of this application.

The embodiments in this specification are all described in a progressive manner. For same or similar parts in the embodiments, refer to these embodiments. Each embodiment focuses on a difference from other embodiments. Especially, device embodiments are basically similar to a method embodiment, and therefore are described briefly. For related parts, refer to partial descriptions in the method embodiment. The described device embodiments are merely examples. The modules described as separate parts may or may not be physically separate, and parts displayed as modules may or may not be physical modules, may be located in one position, or may be distributed on a plurality of network units. Some or all the modules may be selected based on actual requirements to achieve the objectives of the solutions of the embodiments. A person of ordinary skill in the art may understand and implement the embodiments without creative efforts.

The foregoing descriptions are merely example implementations of this application, but are not intended to limit the protection scope of this application.

What is claimed is:

1. A network device comprising:
   at least four nodes defining a stereoscopic network structure, and the at least four nodes comprise a first node and a second node;
   wherein the first node is configured to receive a first packet and a second packet, wherein the first packet and the second packet correspond to the same source node and the same destination node in the network device, and wherein the destination node is the second node;
   wherein the first node is further configured to forward the first packet to the destination node along a first path based on a preset first traffic distribution ratio;
   wherein the first node is further configured to send the second packet to the destination node along a second path based on a preset second traffic distribution ratio; and
   wherein the first traffic distribution ratio and the second traffic distribution ratio are determined based on a load sharing algorithm, the load sharing algorithm is an equivalent resistance method in which a structure formed by the network nodes in the network device is treated as a resistor network, the network node is treated as an electric circuit node, a bandwidth between the network nodes is treated as an equivalent electrical resistance between circuit nodes, a path option of traffic from the source node to the destination node and a traffic distribution ratio in the network device are treated as a problem relating to a path option of a current from an input circuit node to an output circuit node and a current distribution ratio in the resistor network, and a result of the distribution ratio of the current in the resistor network are obtained based on electric transmission properties.

2. The network device according to claim 1, wherein the first node is the source node, and the first node is further configured to encapsulate indication information of the first path into the first packet, wherein the indication information of the first path is used to indicate each a plurality of hop nodes on the first path from the source node to the destination node.

3. The network device according to claim 1, wherein the first node is configured to send the second packet to a next hop node of the plurality of hop nodes based on indication information of the second path.

4. The network device according to claim 1, wherein the first node determines a granularity of the first traffic distribution ratio and the second traffic distribution ratio is based on at least one of:
   (a) a packet quantity;
   (b) a packet length; and
   (c) a packet quantity and a packet length.

5. The network device according to claim 4, wherein the packet length is a quantity of bytes comprised in a packet or a quantity of units comprised in a packet.

6. The network device according to claim 1, wherein the stereoscopic network structure is one of a tetrahedron, a hexahedron, an octahedron and a triangular prism.

7. The network device according to claim 1, wherein the first traffic distribution ratio is not equal to the second traffic distribution ratio.

8. The network device according to claim 1, wherein the first traffic distribution ratio is equal to the second traffic distribution ratio.

9. A network device comprising:
   at least three nodes, wherein the at least three nodes form a ring network structure, and wherein the at least three nodes comprise a first node and a second node:
   wherein the first node is configured to receive a first packet and a second packet, wherein the first packet and the second packet correspond to the same source node and the same destination node in the network device, and the destination node is the second node;
   wherein the first node is further configured to forward the first packet to the destination node along a first path based on a preset first traffic distribution ratio;
   wherein the first node is further configured to send the second packet to the destination node along a second path based on a preset second traffic distribution ratio, wherein the first traffic distribution ratio is not equal to the second traffic distribution ratio; and
   wherein the first traffic distribution ratio and the second traffic distribution ratio are determined by using an equivalent resistance method in which a structure formed by the network nodes in the network device is treated as a resistor network, the network node is treated as an electric circuit node, a bandwidth between the network nodes is treated as an equivalent electrical resistance between circuit nodes, a path option of traffic from the source node to the destination node and a traffic distribution ratio in the network device are treated as a problem relating to a path option of a current from an input circuit node to an output circuit node and a current distribution ratio in the resistor network, and a result of the distribution ratio of the current in the resistor network are obtained based on electric transmission properties.

10. The network device according to claim 9, wherein the first node is the source node, and the first node is further configured to encapsulate indication information of the first path into the first packet, wherein the indication information of the first path is used to indicate each of a plurality of hop nodes on the first path from the source node to the destination node, or the indication information of the first path is used to indicate information about a next hop node of the plurality of hop nodes on the first path from the source node to the destination node.

11. The network device according to claim 9, wherein the first node is configured to:
   send the second packet to a next hop node of the first node based on indication information of the second path.

12. The network device according to claim 9, wherein the first node determines a granularity of the first traffic distribution ratio and the second traffic distribution ratio based on at least one of:
   (a) a packet quantity;
   (b) a packet length; and
   (c) a packet quantity and a packet length.

13. The network device according to claim 12, wherein the packet length is a quantity of bytes comprised in a packet or a quantity of units comprised in a packet.

14. The network device according to claim 9, wherein the stereoscopic network structure is one of a tetrahedron, a hexahedron, an octahedron and a triangular prism.

15. A computer program product including computer-executable instructions recorded on non-transient media which, when executed by a computer processor, cause the computer processor to perform the method comprising:
   receiving a first packet and a second packet, wherein the first packet and the second packet correspond to the same source node and the same destination node in a network device, the network device comprises at least four nodes, the at least four nodes form a stereoscopic network structure, and the at least four nodes comprise the source node and the destination node;
   forwarding the first packet to the destination node along a first path based on a preset first traffic distribution ratio; and
   sending the second packet to the destination node along a second path based on a preset second traffic distribution ratio, wherein the first traffic distribution ratio and the second traffic distribution ratio are determined based on a load sharing algorithm, the load sharing algorithm is an equivalent resistance method in which a structure formed by the network nodes in the network device is treated as a resistor network, the network node is treated as an electric circuit node, a bandwidth between the network nodes is treated as an equivalent electrical resistance between circuit nodes, a path option of traffic from the source node to the destination node and a traffic distribution ratio in the network device are treated as a problem relating to a path option of a current from an input circuit node to an output circuit node and a current distribution ratio in the resistor network, and a result of the distribution ratio of the current in the resistor network are obtained based on electric transmission properties.

* * * * *